(12) United States Patent
Takahashi

(10) Patent No.: US 9,118,788 B2
(45) Date of Patent: Aug. 25, 2015

(54) DISPLAY DEVICE AND METHOD OF CONTROLLING THE SAME

(71) Applicant: CANON KABUSHIKI KAISHA, Tokyo (JP)

(72) Inventor: Katsuyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/814,585

(22) PCT Filed: Oct. 12, 2012

(86) PCT No.: PCT/JP2012/077015
§ 371 (c)(1),
(2) Date: Feb. 6, 2013

(87) PCT Pub. No.: WO2013/069430
PCT Pub. Date: May 16, 2013

(65) Prior Publication Data
US 2014/0153060 A1    Jun. 5, 2014

(30) Foreign Application Priority Data

Nov. 10, 2011    (JP) .................................. 2011-246858

(51) Int. Cl.
*H04N 1/00* (2006.01)
*G06F 3/12* (2006.01)

(52) U.S. Cl.
CPC .......... *H04N 1/00392* (2013.01); *G06F 3/1204* (2013.01); *G06F 3/125* (2013.01); *G06F 3/1205* (2013.01); *G06F 3/1253* (2013.01); *G06F 3/1271* (2013.01); *G06F 3/1279* (2013.01); *H04N 1/00411* (2013.01); *H04N 1/00424* (2013.01); *H04N 1/00448* (2013.01); *H04N 1/00456* (2013.01); *H04N 1/00466* (2013.01); *H04N 1/00469* (2013.01); *H04N 1/00472* (2013.01); *H04N 1/00474* (2013.01); *H04N 1/00482* (2013.01); *H04N 2201/0094* (2013.01)

(58) Field of Classification Search
None
See application file for complete search history.

(56) References Cited

U.S. PATENT DOCUMENTS 6,567,628 B1    5/2003    Guillemin et al.
8,064,335 B2    11/2011    Kamuro et al.
(Continued)

FOREIGN PATENT DOCUMENTS

JP    2003-219147 A    7/2003
JP    2006-033605 A    2/2006
(Continued)

OTHER PUBLICATIONS

Notification of Transmittal of the International Search Report and the Written Opinion of the International Searching Authority dated Dec. 4, 2012; a Written Opinion of the International Searching Authority; and an International Search Report.

*Primary Examiner* — Kimberly A Williams
(74) *Attorney, Agent, or Firm* — Fitzpatrick, Cella, Harper & Scinto

(57) ABSTRACT

This invention provides a mechanism for doing print settings for a plurality of designated images by an intuitive operation. To achieve this, when a touch operation of a user for a plurality of images displayed on a screen has been detected, a display device according to one aspect of this invention displays a setting screen to set the print conditions of the plurality of images, and controls printing of the plurality of images in accordance with the print conditions set using the setting screen.

10 Claims, 28 Drawing Sheets

(56) References Cited

U.S. PATENT DOCUMENTS

| | | | |
|---|---|---|---|
| 2003/0081019 A1* | 5/2003 | Frolik et al. | 347/5 |
| 2003/0086721 A1 | 5/2003 | Guillemin et al. | |
| 2006/0250630 A1* | 11/2006 | Mori | 358/1.13 |
| 2008/0218816 A1* | 9/2008 | Sakuramata et al. | 358/537 |
| 2009/0164894 A1* | 6/2009 | Takekawa et al. | 715/274 |
| 2009/0227436 A1 | 9/2009 | Takahashi | |
| 2010/0034112 A1 | 2/2010 | Kamuro et al. | |
| 2011/0043458 A1* | 2/2011 | Kumor | 345/173 |
| 2011/0128247 A1* | 6/2011 | Sensu | 345/173 |
| 2011/0199639 A1* | 8/2011 | Tani et al. | 358/1.15 |
| 2011/0235110 A1* | 9/2011 | Tani et al. | 358/1.15 |
| 2011/0246947 A1 | 10/2011 | Hirohata et al. | |
| 2012/0079375 A1* | 3/2012 | Ogino et al. | 715/274 |
| 2012/0086652 A1* | 4/2012 | Kim et al. | 345/173 |
| 2012/0242604 A1* | 9/2012 | Kato | 345/173 |
| 2012/0243020 A1* | 9/2012 | Saito | 358/1.13 |
| 2012/0250072 A1* | 10/2012 | Miller et al. | 358/1.15 |
| 2013/0235408 A1* | 9/2013 | Yamaguchi | 358/1.13 |
| 2014/0092426 A1* | 4/2014 | Fujishita et al. | 358/1.15 |
| 2014/0092427 A1* | 4/2014 | Nakamura et al. | 358/1.15 |
| 2014/0146330 A1* | 5/2014 | Miyata | 358/1.9 |

FOREIGN PATENT DOCUMENTS

| | | |
|---|---|---|
| JP | 2008-169029 A | 7/2008 |
| JP | 2008-193419 A | 8/2008 |
| JP | 2010-041603 A | 2/2010 |
| JP | 2011-217081 A | 10/2011 |

* cited by examiner

F I G. 14A
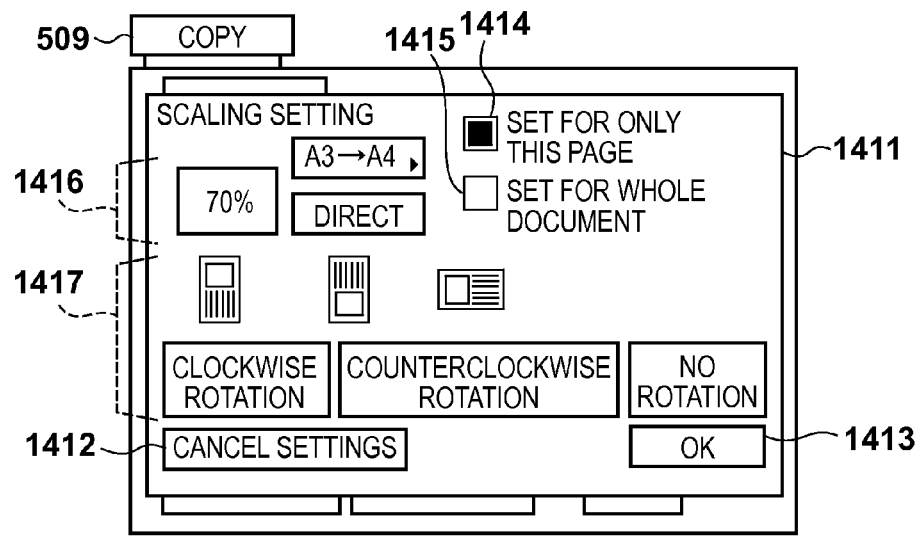
F I G. 14B
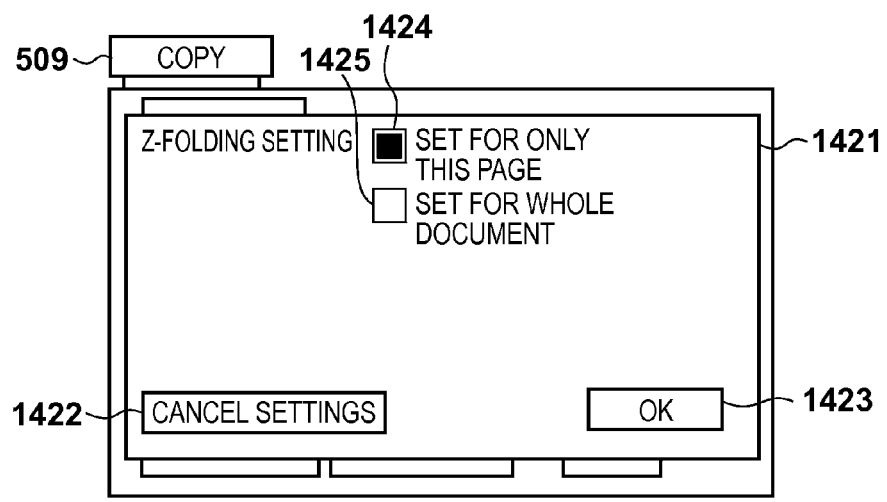

DISPLAY DEVICE AND METHOD OF CONTROLLING THE SAME

TECHNICAL FIELD

The present invention relates to a display device and a method of controlling the same.

BACKGROUND ART

Apparatuses equipped with a touch panel are going commercial and proliferating in recent years. Especially, an apparatus having a multi-touch function allows an image to be intuitively enlarged or reduced by an operation using a plurality of fingers. It can be considered that a high-performance digital MFP (Multifunction Peripheral) is provided with such a touch panel, thereby improving the operability of the apparatus.

On the other hand, an MFP conventionally reduces an image obtained by reading a document or received from a PC and displays (previews) it on the operation unit. When a recent upsized touch panel is employed as the operation unit of the MFP, more advanced operation settings can be done on the preview image, or a plurality of images can simultaneously be previewed. In particular, there has been proposed an apparatus that enables post-processing settings such as executable stapling or punching in accordance with a position pressed by the user on a preview image (Japanese Patent Laid-Open No. 2010-41603).

In the related art, it is impossible to do settings for a plurality of designated images by an intuitive operation, although a plurality of images can be previewed simultaneously on a large screen.

In addition, when the user does print settings for a plurality of designated images, the settable items change depending on the combination of the designated images. For example, if all of the plurality of designated images have the same size, they can be printed on single paper sheets by double-sided printing. However, if the images have different sizes, they cannot be printed on single paper sheets by double-sided printing.

SUMMARY OF INVENTION

In order to solve the above-described problem of the related art, the present invention provides a mechanism capable of doing print settings for a plurality of designated images by an intuitive operation.

According to one aspect of the present invention, a display device includes a detection unit configured to detect a touch operation of a user on a screen, a display control unit configured to, when the detection unit has detected the touch operation for a plurality of images displayed on the screen, display a setting screen to set print conditions of the plurality of images, and a control unit configured to control printing of the plurality of images in accordance with the print conditions set using the setting screen.

According to another aspect of the present invention, a display device includes a detection unit configured to detect a touch operation of a user on a screen that displays a plurality of images, a comparison configured to, when one or more of the plurality of images displayed on the screen have been designated, and the detection unit has detected the touch operation, compare a size of the designated image with sizes of remaining undesignated images, and a display control unit configured to, when the size of the designated image and the sizes of the remaining undesignated images are different from each other as a result of comparison by the comparison unit, display a setting screen to print the designated image and the remaining undesignated images in equal size. In addition, a control unit is configured to control printing of the plurality of images in accordance with conditions set using the setting screen.

According to still another aspect of the present invention, there is provided a method of controlling a display device, comprising: detecting a touch operation of a user on a screen; when the touch operation for a plurality of images displayed on the screen has been detected in the detecting, displaying a setting screen to set print conditions of the plurality of images; and controlling printing of the plurality of images in accordance with the print conditions set using the setting screen.

According to yet another aspect of the present invention, there is provided a method of controlling a display device, comprising: detecting a touch operation of a user on a screen that displays a plurality of images; when one or more of the plurality of images displayed on the screen have been designated, and the touch operation has been detected in the detecting, comparing a size of the designated image with sizes of remaining undesignated images; when the size of the designated image and the sizes of the remaining undesignated images are different from each other as a result of comparison in the comparing, displaying a setting screen to print the designated image and the remaining undesignated images in equal size; and controlling printing of the plurality of images in accordance with conditions set using the setting screen.

According to still another aspect of the present invention, a display device includes a display unit configured to display an image, a detection unit configured to detect an operation performed by a user for the image displayed on the display unit, and a setting unit configured to, when the detection unit has detected an operation of making a plurality of images close to each other, set to print the plurality of images on one sheet.

According to the present invention, it is possible to do print settings for a plurality of designated images by an intuitive operation.

Further features of the present invention will become apparent from the following description of exemplary embodiments (with reference to the attached drawings).

BRIEF DESCRIPTION OF DRAWINGS

FIGS. 14A and 14B are views showing examples of operation screens according to the second embodiment;

DESCRIPTION OF EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1A:
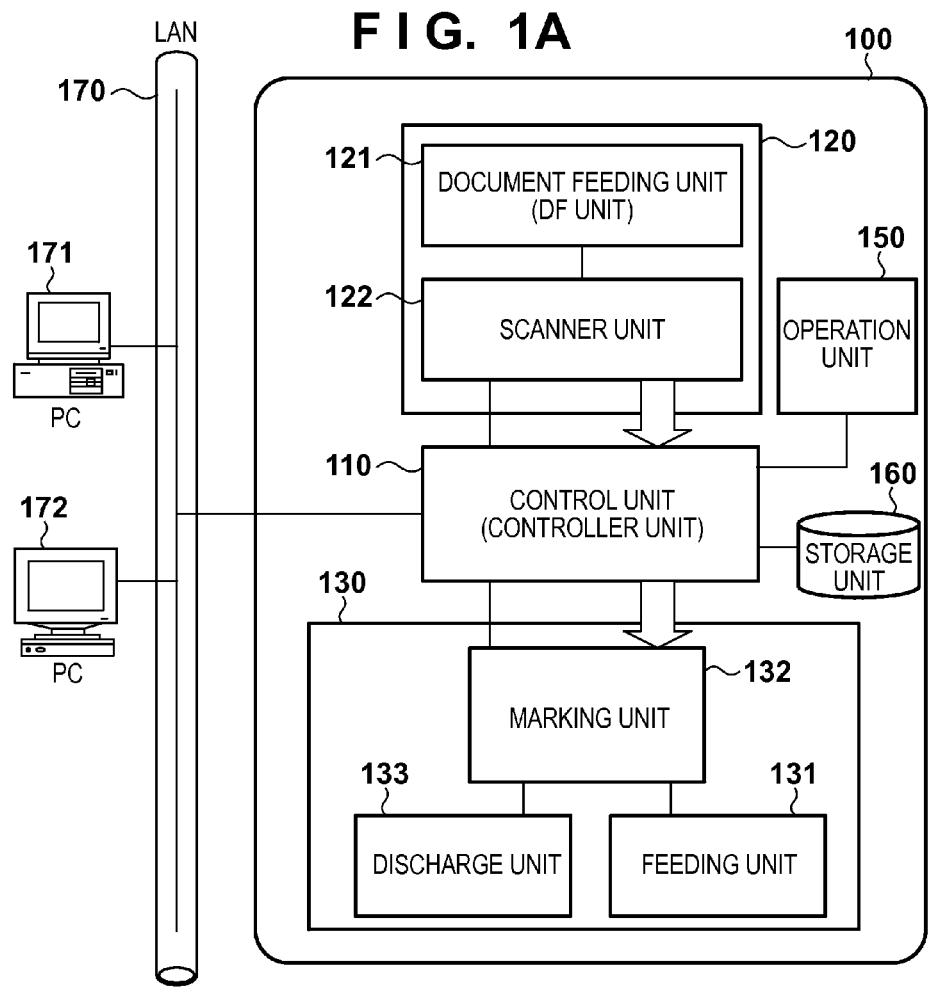
FIG. 1A is a block diagram showing the arrangement of an image forming apparatus (printing apparatus) according to an embodiment of the present invention.
Figure 1B:
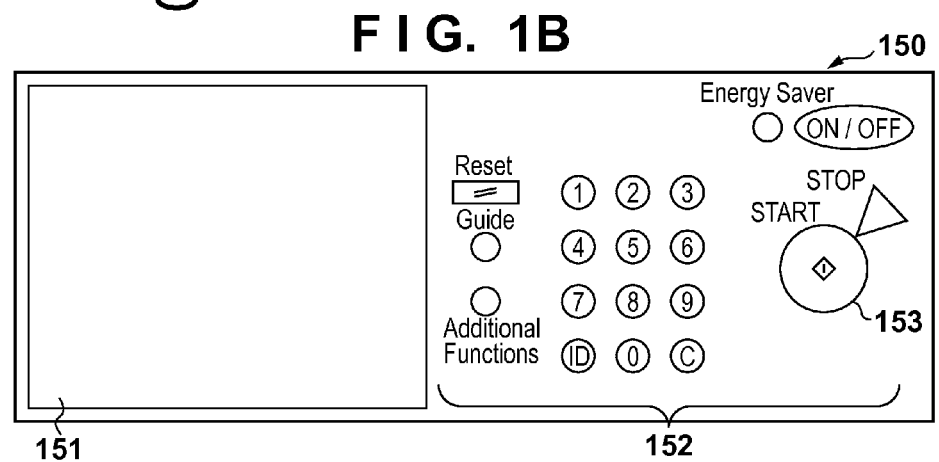
FIG. 1B is a plan view of the operation unit of the image forming apparatus.

FIG. 1A is a block diagram showing the arrangement of an image forming apparatus (printing apparatus) according to an embodiment of the present invention. FIG. 1B is a plan view of the operation unit.

Referring to FIG. 1A, an image forming apparatus 100 is connected to host computers (in this embodiment, a first host computer (PC) 171 and a second host computer (PC) 172) via a LAN 170 such as Ethernet®. The image forming apparatus 100 includes a reader unit 120 that performs image data reading processing, and a printer unit 130 that performs image data output processing. The image forming apparatus 100 also includes an operation unit 150 including a keyboard used to perform an image data input/output operation, and a liquid crystal panel on which, for example, image data or various kinds of functions are displayed/set. The image forming apparatus 100 also includes a storage unit 160 capable of storing/saving image data read by the reader unit 120 or image data generated for code data received from the PC 171 or 172 via the LAN 170. A control unit 110 is connected to these constituent elements and controls them. The arrangement of the control unit 110 will be described later in detail with reference to FIG. 2.

The reader unit 120 includes a document feeding unit 121 that conveys a document sheet, and a scanner unit 122 that optically reads a document image and converts it into image data that is an electrical signal. The printer unit 130 includes a feeding unit 131, a marking unit 132, and a discharge unit 133. The feeding unit 131 includes a plurality of stages of paper feed cassettes that store printing paper sheets. The marking unit 132 has a mechanism for transferring/fixing image data to a printing paper sheet. The discharge unit 133 has a mechanism for performing sorting or stapling of printed printing paper sheets and externally discharging them.

The control unit 110 provides a function of controlling the reader unit 120 to read the image data of a document and controlling the printer unit 130 to print image data on a printing paper sheet. The control unit 110 also has a scanner function of converting image data read by the reader unit 120 into code data and transmitting it to the PC 171 or 172 via the network 170. The control unit 110 also has a print function of converting code data received from a PC via the network 170 into image data and causing the printer unit 130 to print it, and other functional blocks.

FIG. 1B is a plan view of the operation unit 150.

The operation unit 150 (display device) is divided into a UI display unit 151 and a hard key operation unit 152, and can set various copy modes (for example, double-sided setting, group, sort, and staple output). Note that these copy modes can be set using the hard key operation unit 152 formed from hard keys or using soft keys displayed on the touch panel of the UI display unit 151. When a start button 153 is pressed, instructed processing starts.

Figure 2:
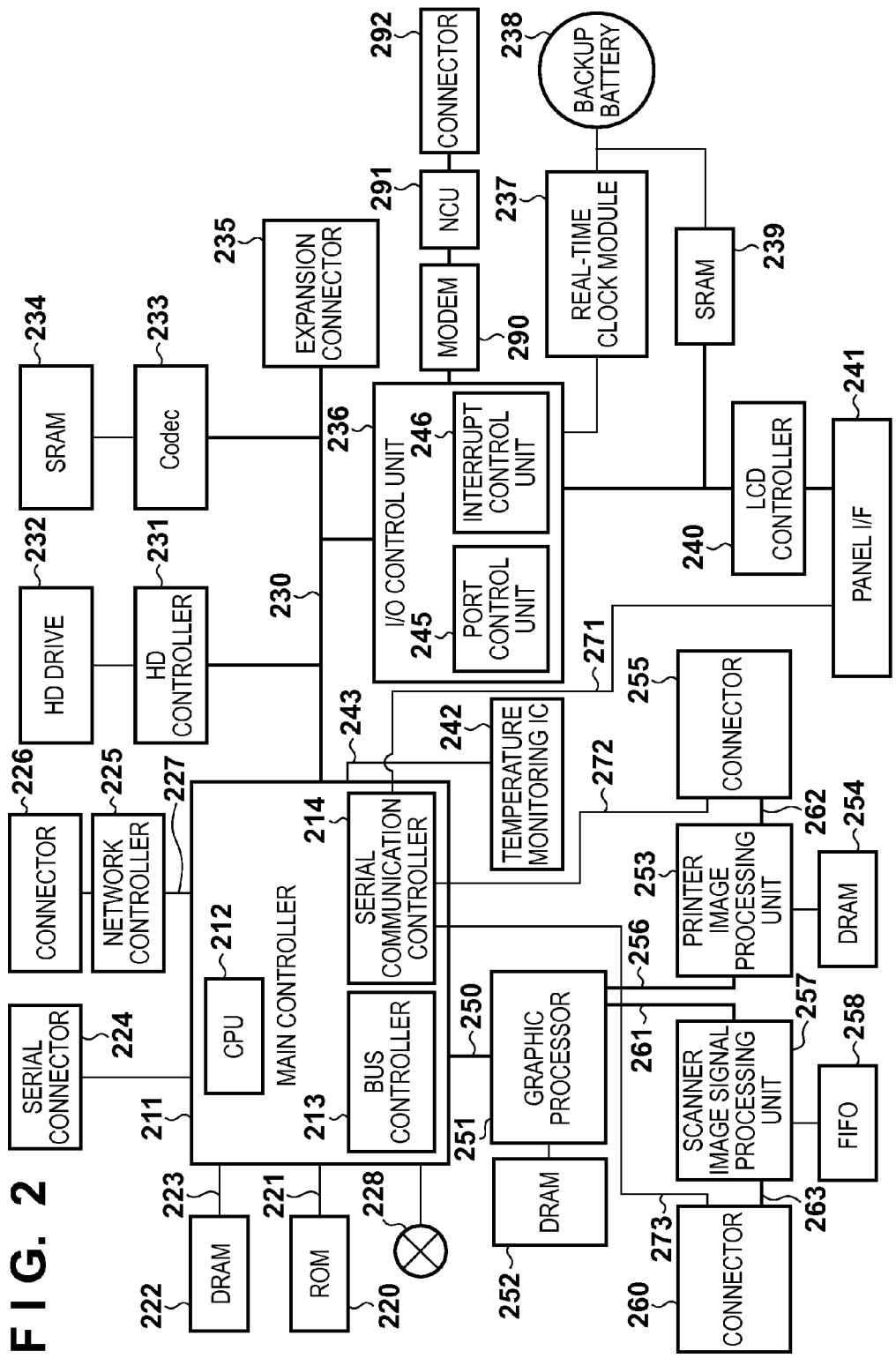
FIG. 2 is a block diagram for explaining details of the control unit of the image forming apparatus.

FIG. 2 is a block diagram for explaining details of the control unit 110.

A main controller 211 of the control unit 110 mainly includes a CPU 212, a bus controller 213, and various kinds of I/F (interface) controller circuits. The CPU 212 and the bus controller 213 control the operation of the entire control unit 110. The CPU 212 operates based on a program read out from a ROM 220 via a ROM I/F 221. An operation of interpreting PDL (Page Description Language) code data received from a PC and rasterizing it into image data is also described in the program and processed by software. The bus controller 213 controls transfer of data input/output from/to each I/F and controls bus arbitration processing or DMA data transfer. A DRAM 222 is connected to the main controller 211 via a DRAM I/F 223 and used as a work area for the CPU 212 to operate or an area to accumulate image data. A start-stop synchronization serial communication controller 214 transmits/receives control commands to/from the CPUs of the reader unit 120 and the printer unit 130 via serial buses 272 and 273, and performs communication for the touch panel or key input of the operation unit 150.

A network controller 225 is connected to the main controller 211 via an I/F 227 and connected to an external network via a connector 226. A general example of the network is Ethernet. A serial connector 224 is connected to the main controller 211 and communicates with an external device. A general example of the serial bus is USB. A fan 228 is connected to the main controller 211 and used to cool the control unit 110. A temperature monitoring IC 242 is connected to the main controller 211 via a serial bus 243. The temperature monitoring IC 242 is used to control the fan 228 or for temperature correction of a real-time clock module 237.

An expansion connector 235 used to connect an expansion board, an I/O control unit 236, an HD controller 231, and a Codec (compression/decompression unit) 233 are connected to a general-purpose high-speed bus 230. A general example of the general-purpose high-speed bus is a PCI bus. The Codec 233 compresses raster image data accumulated in the DRAM 222 by a method such as MH, MR, MMR, JBIG, or JPEG, and conversely, decompresses compressed and accumulated code data into raster image data. An SRAM 234 is used as a temporary work area of the Codec 233. Data transfer to/from the DRAM 222 is controlled by the bus controller 213, and data is DMA-transferred. The HD controller 231 is used to connect an external storage device. In this embodiment, a hard disk drive (HD drive) 232 is connected via the interface. The HD drive 232 is used to store programs or image data. The I/O control unit 236 performs data communication with an LCD controller 240 or a MODEM 290, and includes a port control unit 245 and an interrupt control unit 246. A panel I/F 241 is connected to the LCD controller 240, and includes an I/F to be displayed on the UI display unit 151 of the operation unit 150, and a key input I/F 271 used to input the hard keys or touch panel keys. The operation unit 150 includes the UI display unit 151 having a liquid crystal display unit and a touch panel bonded onto the liquid crystal display unit, and the hard key operation unit 152 having a plurality of hard keys. A signal input by the touch panel or a hard key is transmitted to the CPU 212 via the key input I/F 271. The UI display unit 151 displays image data sent from the panel I/F 241. The UI display unit 151 displays image data or functions in the operation of the image forming apparatus 100.

The real-time clock module 237 is used to update/save the date and time managed in the apparatus and backed up by a backup battery 238. An SRAM 239 is backed up by the backup battery 238 and accumulates user modes, various kinds of setting information, file management information of the HD drive 232, and the like. A graphic processor 251 performs processing such as rotation, scaling, color space conversion, binarization, scanner image input, and printer image output for image data accumulated in the DRAM 222. A DRAM 252 is used as a temporary work area of the graphic processor 251. The graphic processor 251 is connected to the main controller 211 via an I/F 250. Data transfer to/from the DRAM 222 is controlled by the bus controller 213, and data is DMA-transferred. Connectors 260 and 255 are connected to the reader unit 120 and the printer unit 130, respectively, and include the start-stop serial I/Fs 273 and 272 and video I/Fs 263 and 262, respectively. A scanner image signal processing unit 257 is connected to the reader unit 120 via the connector 260, and connected to the graphic processor 251 via a scanner bus 261. The scanner image signal processing unit 257 also has a function of performing predetermined processing for an image received from the reader unit 120, and a function of outputting, to the scanner bus 261, a control signal generated based on a video control signal sent from the reader unit 120. A FIFO 258 is connected to the scanner image signal processing unit 257 and used to perform line correction of a video signal sent from the reader unit 120.

A printer image processing unit 253 is connected to the printer unit 130 via the connector 255. The printer image processing unit 253 is also connected to the graphic processor 251 via a printer bus 256, and has a function of performing predetermined processing for image data output from the graphic processor 251 and outputting it to the printer unit 130. The printer image processing unit 253 also has a function of outputting, to the printer bus 262, a control signal generated based on a video control signal sent from the printer unit 130. A DRAM 254 is connected to the printer image processing unit 253 and used to delay a video signal by a predetermined time. Transfer of raster image data rasterized on the DRAM 222 to the printer unit 130 is controlled by the bus controller 213. The raster image data is DMA-transferred to the printer unit 130 via the graphic processor 251, the printer image processing unit 253, and the connector 255.

The MODEM 290 is connected to the I/O control unit 236 and an NCU (Network Control Circuit) 291, and modulates a signal to be FAX-transmitted to a PSTN (public network) and demodulates a received signal via the connector 292. When receiving and printing FAX data, the data input from the PSTN is demodulated by the NCU 291 and the MODEM 290 and rasterized on the DRAM 222 by the main controller 211 via the I/O control unit 236. Transfer of the data is controlled by the bus controller 213, and the data is DMA-transferred to the printer unit 130 via the graphic processor 251, the printer image processing unit 253, and the connector 255. When scanning and transmitting FAX data, a video signal sent from the reader unit 120 is transferred to the main controller 211 via the connector 260, the scanner image signal processing unit 257, and the graphic processor 251. The data from the I/O control unit 236 is further modulated by the MODEM 290 and the NCU 291 and output to the PTSN.

The hardware arrangement of the image forming apparatus 100 has been described above with reference to FIGS. 1A, 1B, and 2. Copy processing that is the most basic function of the image forming apparatus 100 will be described next with reference to FIGS. 3A, 3B, and 4.

Figure 3A:
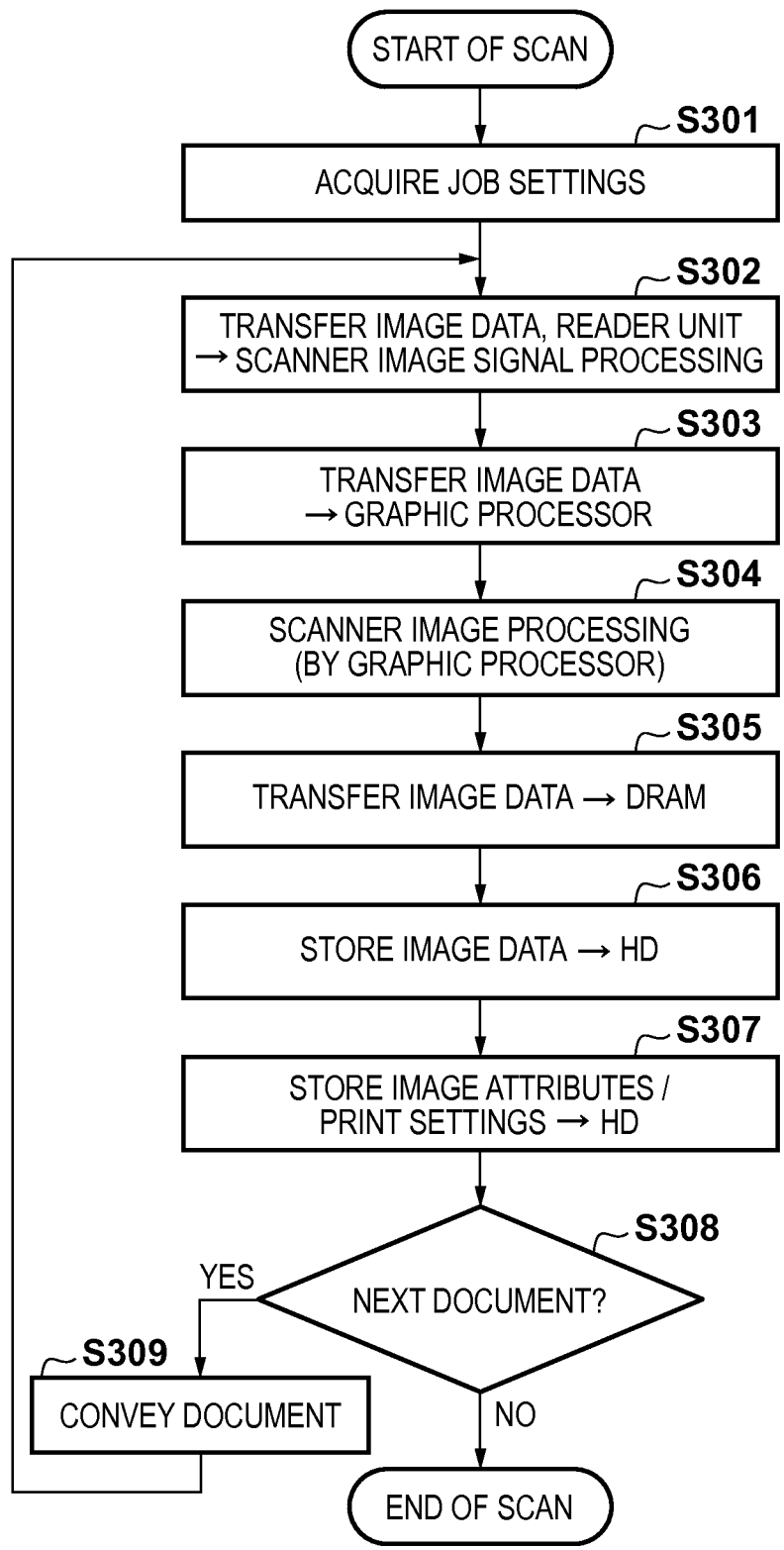
FIG. 3A is a flowchart for explaining scan processing at the time of copy processing according to the first embodiment.
Figure 3B:
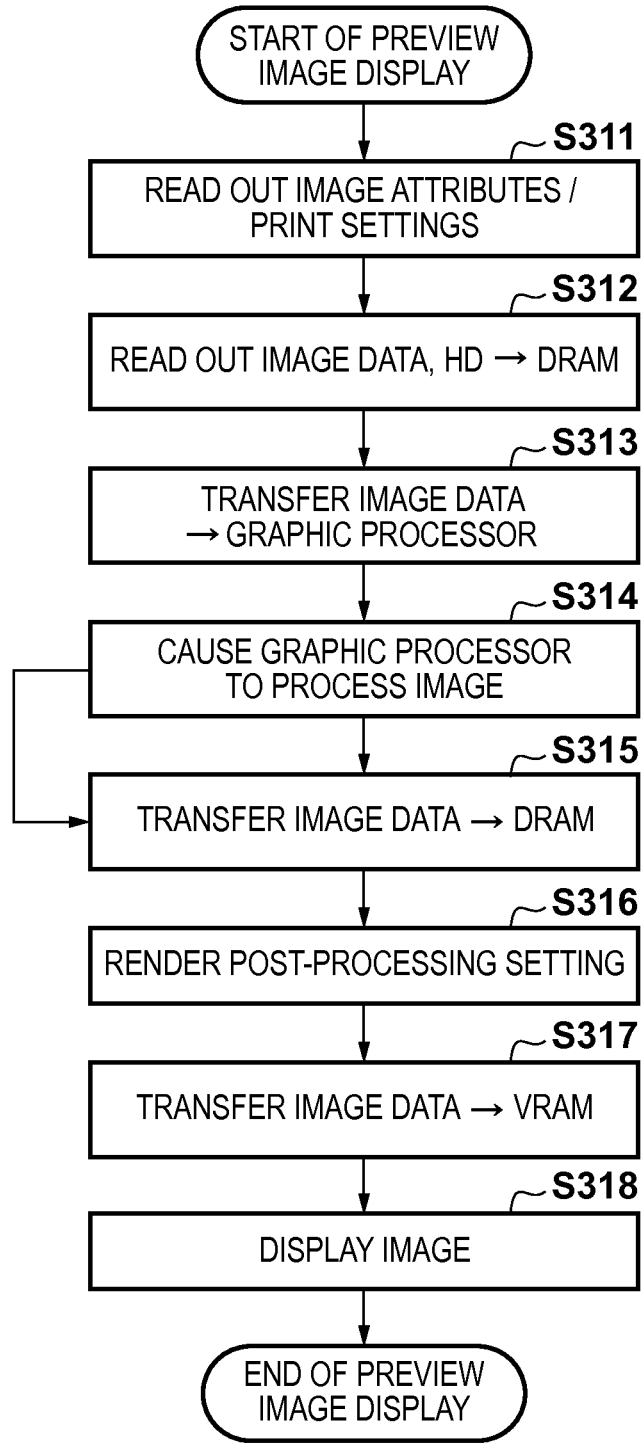
FIG. 3B is a flowchart for explaining preview processing of a scanned image according to the first embodiment.

FIG. 3A is a flowchart for explaining scan processing at the time of copy processing according to this embodiment. FIG. 3B is a flowchart for explaining preview processing of a scanned image. Note that the program used to execute these processes is stored in the ROM 220 and executed under the control of the CPU 212 of the main controller 211.

In step S301, setting contents of copy settings that are done via the operation unit 150 by the user for a copy image output job are acquired. The copy setting contents include the color mode, the number of copies, the paper size, single-sided/double-sided printing, the enlargement/reduction ratio, and the presence/absence of sort output and stapling. The color mode, single-sided/double-sided printing of a document, the enlargement/reduction ratio, and the like are particularly associated with scan. The process then advances to step S302. When the user presses the start button 153 of the operation unit 150 to instruct the start of copy, the main controller 211 of the control unit 110 controls the reader unit 120 to read the image data of the document. First, the document feeding unit 121 feeds the pages of the document placed on it to the platen glass one by one, and at this time, detects the document size. The document is exposed and scanned based on the detected document size, thereby reading image data. The read image data is sent to the graphic processor 251 via the scanner image signal processing unit 257. The graphic processor 251 compresses the image data into a designated image format and stores it in the DRAM 222. In this embodiment, the image data is always read as a direct image (100%) independently of the enlargement/reduction ratio of the copy settings. The scaling processing is performed by the graphic processor 251 in both the main scanning direction and in the sub-scanning direction. The process then advances to step S303. The scanner image signal processing unit 257 performs image processing such as merging processing or masking of the image data, and the processed image data is transferred to the graphic processor 251. In step S304, the graphic processor 251 performs image processing based on the parameters of the copy settings. For example, when an enlargement ratio of 400% is set, scaling processing is performed in both the main scanning direction and in the sub-scanning direction using an image scaling unit that is a module of the graphic processor 251. When the image processing of the image data is completed, the process advances to step S305. In step S305, the graphic processor 251 compresses the image data that has undergone the image processing into a designated image format and transfers it to the main controller 211. In this embodiment, the compression format is the general JPEG. The main controller 211 stores the transferred image data in the DRAM 222.

The process then advances to step S306. The main controller 211 stores the image data, which is stored in the DRAM 222, in a file having a designated file format, and transfers the image data stored in the file to the HD drive 232 via the HD controller 231. In this embodiment, since the image data compression format is JPEG, the image data is stored in the file by adding a general JPEG header. The read image data is thus stored in the HD drive 232. The process then advances to step S307, where the main controller 211 stores, in a file, the attributes of the scanned image and the setting data for image printing, and transfers the file to the HD drive 232 to store it. The saved image attributes are attributes necessary for decoding and processing the image data at the time of printing, including the numbers of vertical and horizontal pixels, the color space, the number of bits per plane and the number of planes, the JPEG compression coefficient, and information representing whether the image is color or monochrome. The saved print settings include the printing paper size, double-sided setting, the presence/absence of finishing, and the discrimination between color printing and monochrome printing. Note that when saving the files in steps S306 and S307, the page numbers of the files are made identifiable by applying a naming convention to the file names. In addition, the image data file is made to correspond to the attribute/setting files. For example, the image data file name of the first page is set to "copy0001_data.dat", and the attribute/setting file name is set to "copy0001_attr.dat". From the second page as well, the page number is inserted into the numerical part. For, for example, fifth page, the file names are "copy0005 data-.dat" and "copy0005 attr.dat", respectively. This allows to identify the files to read out image data and image attributes/print settings when printing or previewing the image data after the scan. In step S308, it is determined whether a document exists on the document feeding unit 121. If a document exists on the document feeding unit 121, the process advances to step S309 to convey the next document. The process then returns to step S302 to execute scanning of the document. If no next document exists on the document feeding unit 121 in step S308, the scan operation of the copy processing ends.

Processing performed by the main controller 211 when previewing, on the UI display unit 151, image data stored in the HD drive 232 will be described next with reference to FIG. 3B.

First, in step S311, the main controller 211 acquires copy settings done by the user. The settings acquired here are mainly associated with the above-described print operation. Settings that can be reflected on the preview are reflected. The process then advances to step S312. The main controller 211 reads out an image file in the HD drive 232, which is image data to be displayed, and stores it in the DRAM 222. The process then advances to step S313. The main controller 211 transfers the image data stored in the DRAM 222 to the graphic processor 251. In step S314, the graphic processor 251 performs image processing of converting the image data into a format suitable for display. The image processing performed here mainly includes trimming and margin setting of the image data based on the paper size, rotation processing of the image data based on the print direction, scaling processing (resolution conversion processing) based on the size of the display area, and color conversion processing of converting the image data into an RGB color space suitable for the display color space of the liquid crystal panel.

The process then advances to step S315 to transfer the converted image data output from the graphic processor 251 to the DRAM 222 to store it. The process then advances to step S316. The main controller 211 makes the settings such as staple positions, which are not reflected on the image data, displayable by overwriting them on the image data on the DRAM 222. The process then advances to step S317. The main controller 211 transfers the image data on the DRAM 222 to the display RAM (VRAM) of the operation unit 150. The process then advances to step S318. The operation unit 150 displays the image data in the display RAM on the UI display unit 151, and the preview ends.

Note that the preview processing shown in FIG. 3B is processing for image data of one page. When previewing a plurality of pages, the processing is executed a plurality of times for different image data. Even if the user has performed a page turning operation or the like, and it is necessary to preview the image data of a page different from the page under display, the processing is executed using corresponding image data.

Figure 4:
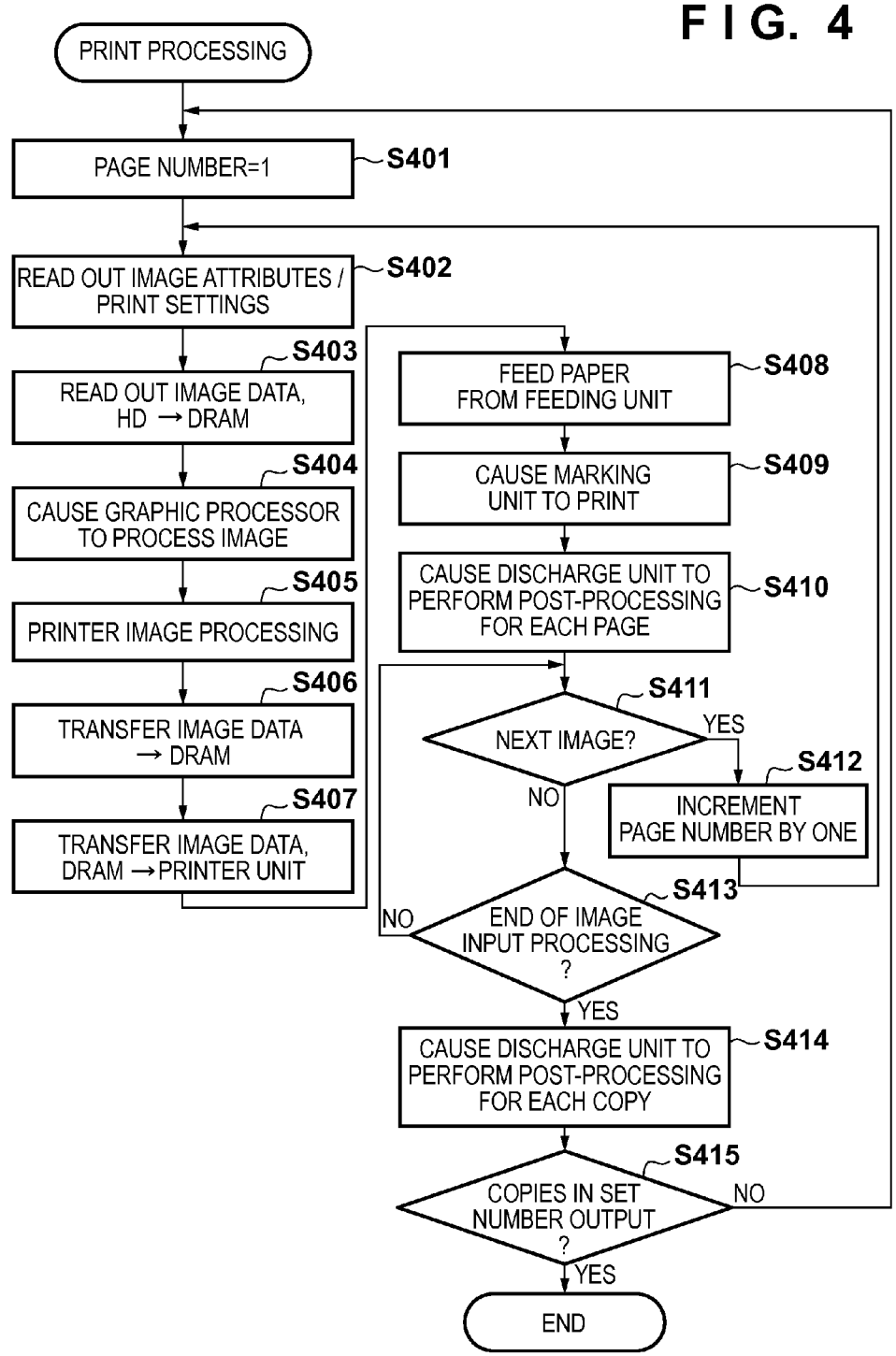
FIG. 4 is a flowchart for explaining print processing of causing the image forming apparatus to print image data.

FIG. 4 is a flowchart for explaining print processing of causing the image forming apparatus according to the embodiment to print image data accumulated in the HD drive 232. Note that the program used to execute this processing is stored in the ROM 220 and executed under the control of the CPU 212 of the main controller 211.

In step S401, the main controller 211 sets "1" as the number of the page to be printed, that is, sets to print the image data from the first page. The subsequent processing is executed for the page number set here. The process then advances to step S402 to read out data from the image attribute/print setting file saved at the time of scan (step S307 of FIG. 3A). Each processing is performed based on the readout image attributes and print settings. The process then advances to step S403. If the image data file to be printed does not exist in the DRAM 222, the image file is read out from the HD drive 232 and stored in the DRAM 222. The process then advances to step S404. The main controller 211 transfers the image data stored in the DRAM 222 to the graphic processor 251, and transfers the image data output from the graphic processor 251 to the printer image processing unit 253. In step S405, the printer image processing unit 253 performs image processing for the transferred image data. In step S406, the image data is stored in the DRAM 254. The process then advances to step S407 to transfer the image data in the DRAM 254 to the printer unit 130 at an appropriate timing while controlling the printer unit 130 via the connector 255.

The process then advances to step S408. The printer unit 130 feeds a paper sheet according to the print settings from the feeding unit 131. If double-sided printing is set, and printing on the reverse surface is to be done, the paper sheet is fed from a double-sided buffer (not shown) of the feeding unit 131. When printing on the obverse surface in double-sided printing or performing single-sided printing, a paper feed cassette that stores paper sheets of a size saved in the print settings is selected from the normal paper feed cassettes of the feeding unit 131, and a paper sheet is fed from there. The process then advances to step S409. The printer unit 130 causes the marking unit 132 to develop/transfer/fix the image data transferred in step S407 onto the paper sheet, thereby printing the image data. The process then advances to step S410. The printer unit 130 causes the discharge unit 133 to execute post-processing for each page of the printed paper sheets. The post-processing executable here changes depending on the function of the discharge unit 133, and mainly includes punch hole formation and output paper folding such as z-folding or c-folding. When the post-processing has ended, the paper sheets are discharged to the discharge port (not shown) of the discharge unit 133. Note that when setting double-sided printing and printing on the obverse surface, the paper sheet is conveyed to the double-sided buffer (not shown) of the feeding unit 131 without performing the post-processing and discharge. In step S408 described above, the paper sheet in the double-sided buffer is fed, thereby executing double-sided printing.

The process then advances to step S411. The main controller 211 determines whether image data to be printed next is accumulated in the HD drive 232. If image data to be printed next exists, the process advances to step S412 to increment the page number by one, that is, set the print processing of the next page. The process then returns to step S402 to execute printing of the next image data. If image data to be printed next does not exist in step S411, the process advances to step S413 to determine whether image input processing, in this case, scan processing has ended for all document pages. If NO in both of steps S411 and S413, the number of pages of the copy to be printed is indefinite. For this reason, steps S411 and S413 are repeated to wait until the number of pages becomes definite. Upon determining in step S413 that the image input processing has ended, the process advances to Step S414. The printer unit 130 executes post-processing for each copy of the printed paper sheets using the discharge unit 133. The post-processing for each copy executed here is stapling or the like. The process then advances to step S415. The main controller 211 determines whether output of copies in the number set in the copy settings is completed. If the output is not completed, the process returns to step S401 to execute print processing from the first image data to print the next copy. If the output of copies in the set number is completed in step S415, the print operation of the copy job ends, and the copy job also ends.

Figure 5A:
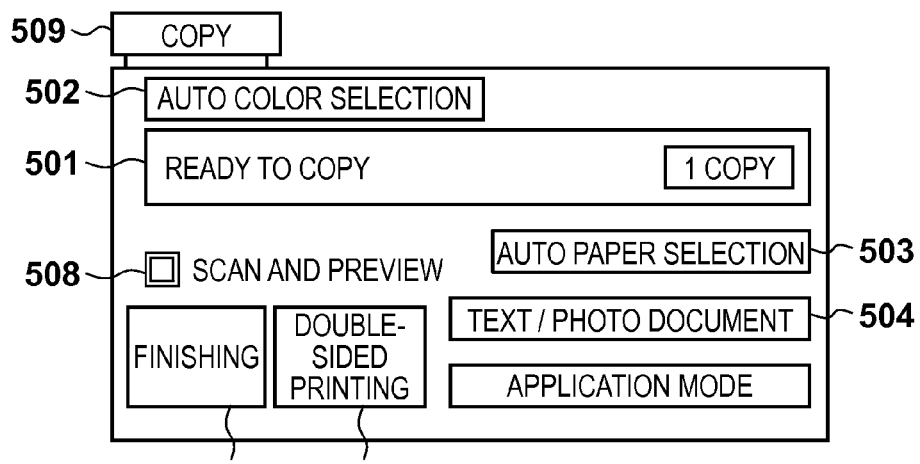
FIGS. 5A, 5B, and 5C are views showing examples of screens displayed on the UI display unit of the image forming apparatus.

FIG. 5A is a view showing an example of an initial screen displayed on the UI display unit 151 under the control of the main controller 211.

Reference numeral 509 denotes a region to select the function of the operation screen. When the operator has pressed the region 509 as well, the main controller 211 displays the screen shown in FIG. 5A on the UI display unit 151. In this example, the copy mode is displayed. A region 501 displays whether the image forming apparatus 100 is in a copy enable state, and the set number of copies. A tab 504 is used to select the document type. When the user designates the tab 504, the control unit 110 displays a popup menu to select three types of modes, that is, "text", "photo", and "text/photo". In FIG. 5A, "text/photo document" is displayed. "Finishing" 506 is a tab used to do settings for various kinds of finishing processing. A double-sided setting tab 507 is used to do settings for double-sided reading and double-sided printing. A reading mode tab 502 is used to select a document reading mode. In FIG. 5A, "auto color selection" is selected. When the user designates the tab 502, the main controller 211 displays a popup menu to select three types of modes, that is, "color", "monochrome", and "auto (ACS)". Note that when "color" is selected, color copy is performed, and when "monochrome" is selected, monochrome copy is performed. When "ACS" is selected, the control unit 110 determines whether all image data signals received from the reader unit 120 are monochrome signals to decide the copy mode. A paper selection tab 503 is a tab used to select the feed stage of the paper sheets to be printed.

A check box 508 is a toggle button to set whether to preview a scanned document image after completion of document scan. When the user removes the checkmark in the check box 508 and starts a copy job, the main controller 211 continuously executes the scan and print processes described with reference to FIGS. 3A, 3B, and 4. On the other hand, when the user places the checkmark in the check box 508 and starts a copy job, a preview screen shown in FIG. 5B is displayed after completion of the scan operation shown in FIG. 3A, thereby previewing the document image.

Figure 5B:
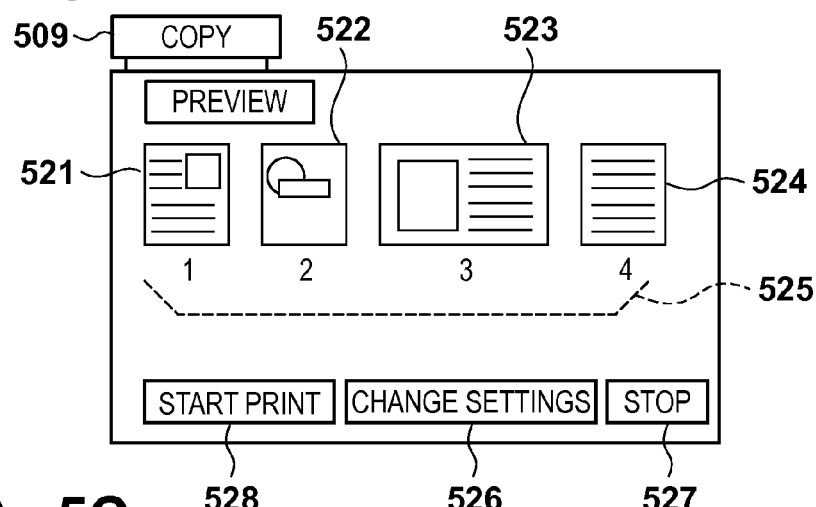

Referring to FIG. 5B, a region 525 is a preview region. Images 521 to 524 are preview examples of scanned images, which are data generated and displayed by the above-described preview processing of the main controller 211 shown in FIG. 3B. A page number is displayed on the lower side of each image. When the user presses a setting change button 526, the main controller 211 displays the same screen as that shown in FIG. 5A to allow the operator to change the settings of the paper feed stage, finishing, or the like. When the user presses a stop button 527, the main controller 211 deletes the scanned image data, displays the screen shown in FIG. 5A, and stops the copy job. When the user presses a print start button 528, the main controller 211 executes the print operation shown in the flowchart of FIG. 4 and resumes the copy job.

Figure 5C:
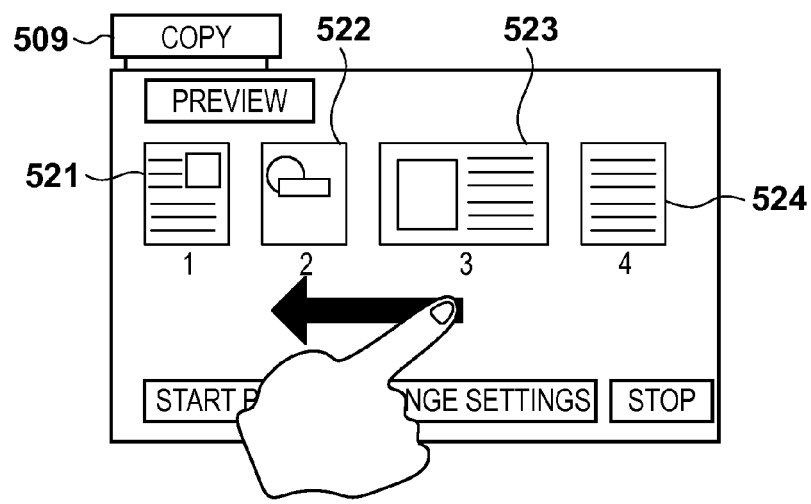

The preview screen shown in FIG. 5B can also be operated by causing the user to perform a gesture operation such as touching a certain region or dragging while keeping a finger touching. Not all operations but several detailed examples will be described here. FIG. 5C shows a flick operation of instructing a scroll operation.

Figure 6A:
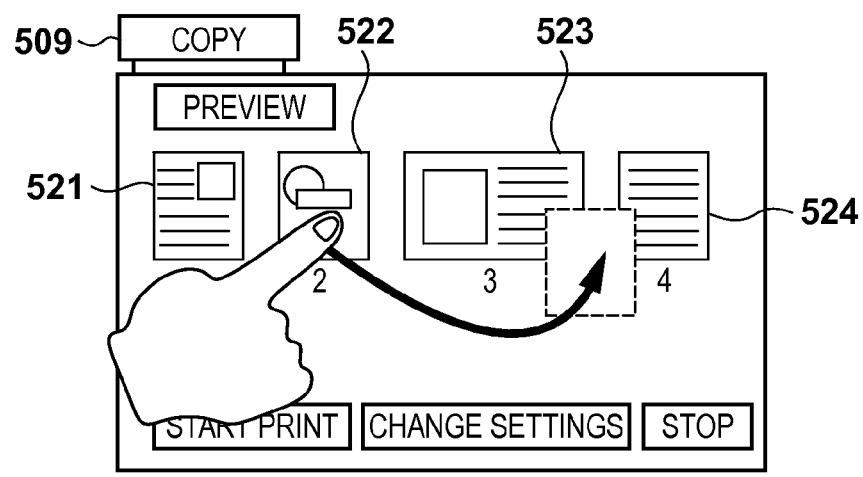
FIGS. 6A and 6B are views showing examples of user operations using the display screen of the UI display unit.

FIG. 6A shows a scroll operation of replacing a displayed image with the page of another page, which is performed by the main controller 211 upon detecting that the user has flicked on the preview region with the finger tip in the horizontal direction (flick operation). In FIG. 6A, the document image 522 of the second page is designated (dragged) and moved to the third page.

Figure 6B:
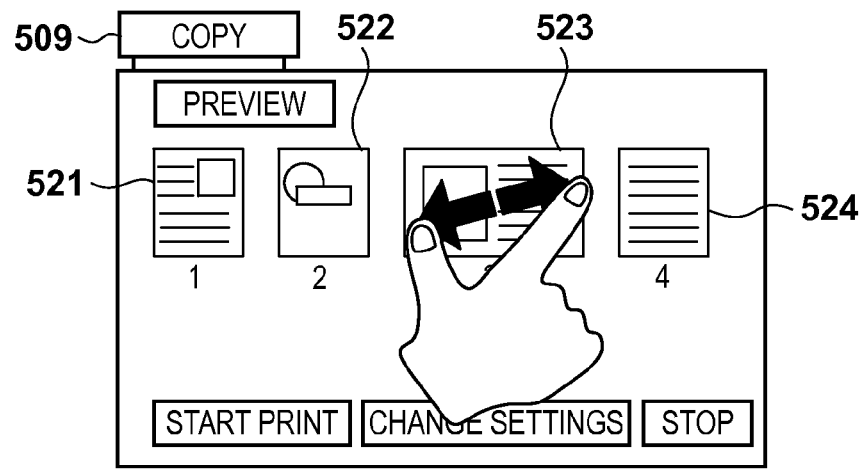

Referring to FIG. 6B, the user touches the image 523 of the third page by two fingers, the thumb and the index finger (multi-touch) and spreads them out (pinch-out operation), thereby enlarging the display of the image 523.

Figure 7:
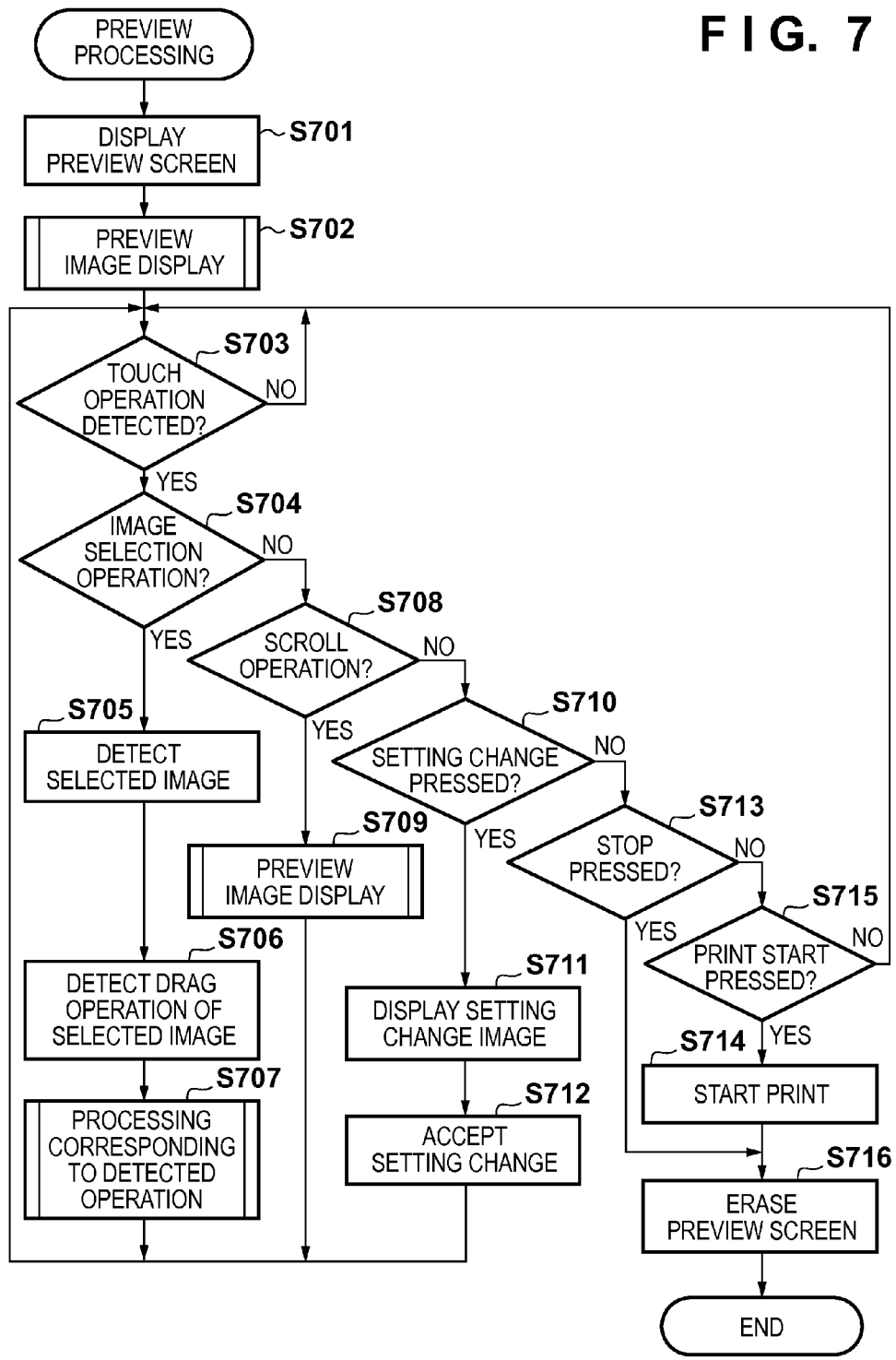
FIG. 7 is a flowchart for explaining processing of the control unit in a state in which the preview screen shown in FIG. 5B is displayed.

FIG. 7 is a flowchart for explaining processing of the control unit 110 in a state in which the preview screen shown in FIG. 5B is displayed. Note that the program used to execute this processing is stored in the ROM 220 and executed under the control of the CPU 212 of the main controller 211. This processing starts when all print target images have been generated by the scan operation of a copy job, and the preview has started.

In step S701, the preview screen shown in FIG. 5B is displayed on the UI display unit 151. The process then advances to step S702 to convert image data stored in the HD drive 232 in accordance with the processing described with reference to the flowchart of FIG. 3B and display the image data on the UI display unit 151. Note that the image conversion and display processing of FIG. 3B is repeated as many number of times as the number of images to be displayed.

In step S703, the processing waits for detecting user's touching the UI display unit 151 (touch panel). Upon detecting the touch operation, the process advances to step S704 to determine whether it is an operation of selecting the displayed image, that is, whether the point where the user has started touching is on the image displayed in step S702. If the operation is image selection, the process advances to step S705 to determine the page of the selected image. The process then advances to step S706 to detect whether the touched point has moved, that is, the presence/absence of a drag operation, and the endpoint of the drag operation. If the user performs the operation using a plurality of fingers, a plurality of selected image pages and a plurality of drag operations are detected in steps S705 and S706. The process then advances to step S707 to perform corresponding processing based on the selected image page and drag operation detected in steps S705 and S706. The corresponding processing here means, for example, changing the printing order by image drag described with reference to FIG. 6A or image display enlargement by the pinch-out operation described with reference to FIG. 6B. Especially characteristic operations and corresponding processing of this embodiment will be described later. When the processing in step S707 ends, the process returns to step S703 to wait for the user's touch operation.

On the other hand, if no image is selected in step S704, the process advances to step S708. Upon detecting, for example, a flick operation as shown in FIG. 5C, the process advances to step S709, regarding the operation as a scroll operation. In step S709, the displayed images are replaced, and image conversion and display described with reference to FIG. 3B are performed. When step S709 ends, the process returns to step S703 to wait for the user's touch operation.

If the operation is not a scroll operation in step S708, the process advances to step S710 to determine whether the user has pressed the setting change button 526 shown in FIG. 5B. If the user has pressed the setting change button 526, the process advances to step S711 to display the same screen as that shown in FIG. 5A to allow to change the settings. After accepting setting changes in step S712, the process returns to step S703 again to wait for the user's touch operation.

If the setting change button 526 has not been pressed in step S710, the process advances to step S713 to determine whether the user has pressed the stop button 527. If the user has pressed the stop button 527, the copy job is also stopped. Hence, the process advances to step S716 to erase the preview screen, and the preview ends.

If the stop button 527 has not been pressed in step S713, the process advances to step S715 to determine whether the user has pressed the print start button 528. If the user has pressed the print start button 528, the process advances to step S714 to start print processing described with reference to the flowchart of FIG. 4. The process then advances to step S716 to erase the preview screen, and the preview ends. If the print start button 528 has not been pressed in step S715, the process returns to step S703 to wait for user input.

First Embodiment

A print setting operation from the preview screen, which is a characteristic feature of the first embodiment, will be described next with reference to the operation screens shown in FIGS. 8A, 8B, 9A, and 9B and the flowchart of FIG. 10.

FIGS. 8A, 8B, 9A, and 9B are views showing examples of operation screens according to the first embodiment. Note that the same reference numerals as in FIGS. 5A, 5B, 5C, 6A, and 6B described above denote the same parts in FIGS. 8A and 8B.

Figure 8A:
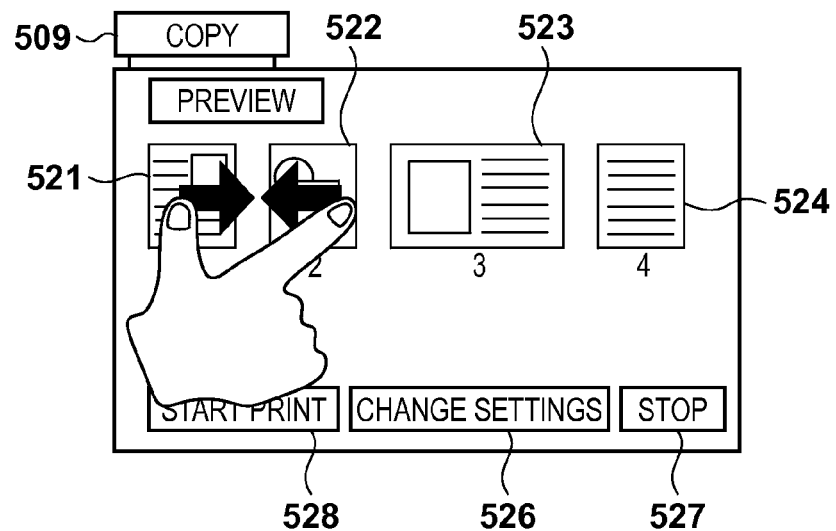
FIGS. 8A and 8B are views showing examples of operation screens according to the first embodiment.

This setting processing starts from a gesture (pinch-in operation) in which the user places fingers simultaneously on two images 521 and 522 on the preview screen and joins the fingers together like pinching, as shown in FIG. 8A. Upon detecting this gesture, a main controller 211 interprets it that the operator has "joined the two images", and displays a menu to set print conditions for printing the two images simultaneously on a single paper sheet. More specifically, the main controller 211 performs display control to display a menu 811 shown in FIG. 8B. In this example, three types of synthesis printing, that is, "print on same paper", "double-sided printing" 812, and "2-in-1" 813 are displayed as the print conditions.

In the menu 811, the selection item 812 is an item to set double-sided printing, and the selection item 813 is an item to set 2-in-1 printing that prints two images synthesized in the horizontal direction. Upon detecting that the user has selected the selection item 812 in the menu 811, the main controller 211 displays a double-sided setting screen 921 shown in FIG. 9A.

In the double-sided setting screen 921, the user selects one of a horizontal open button 924 and a vertical open button 925, thereby doing print settings to obtain a printing result of one of horizontal open and vertical open. Buttons 926 and 927 are used to set whether to apply the double-sided setting to only the designated (operated) page or all the scanned images. When the user presses a setting cancel button 922, the double-sided setting is canceled, and the screen returns to the preview screen shown in FIG. 5A. When the user presses an OK button 923, the double-sided setting is determined and reflected on printing.

Figure 8B:
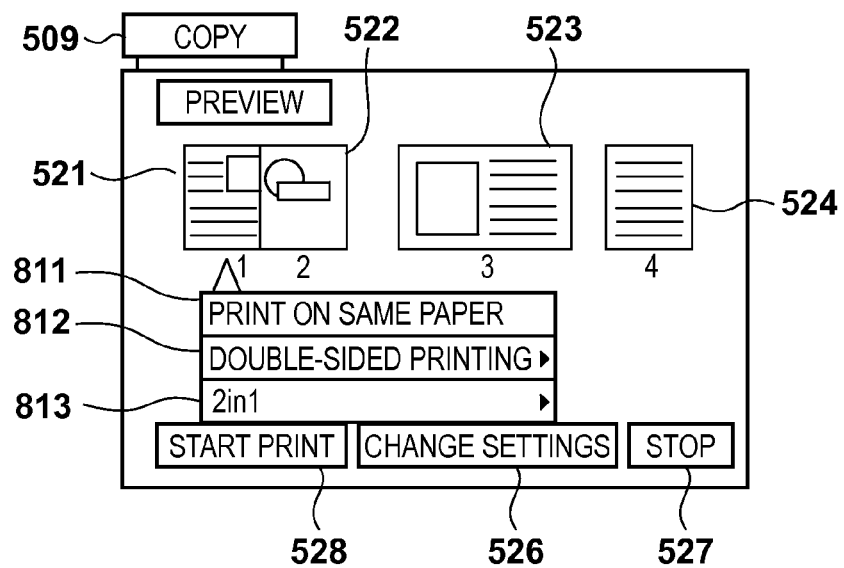
Figure 9A:
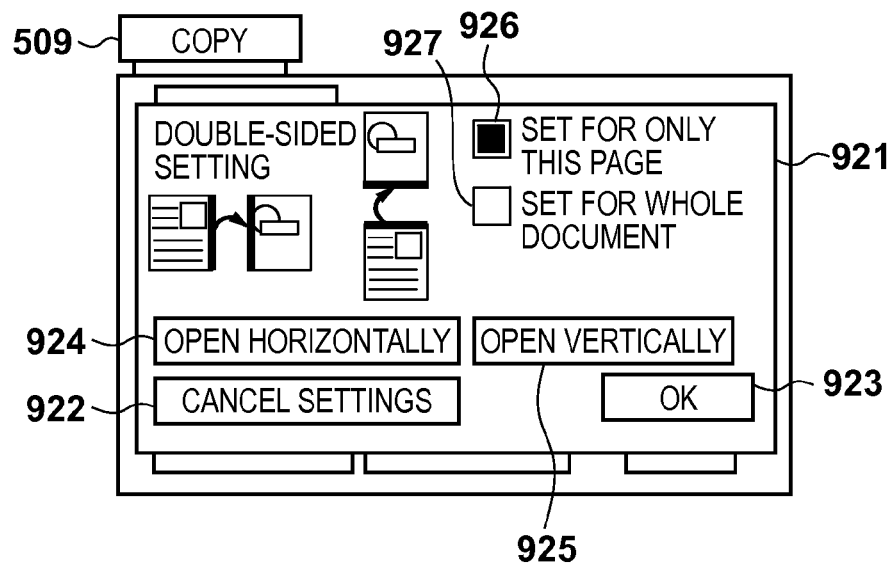
FIGS. 9A and 9B are views showing examples of operation screens according to the first embodiment.
Figure 9B:
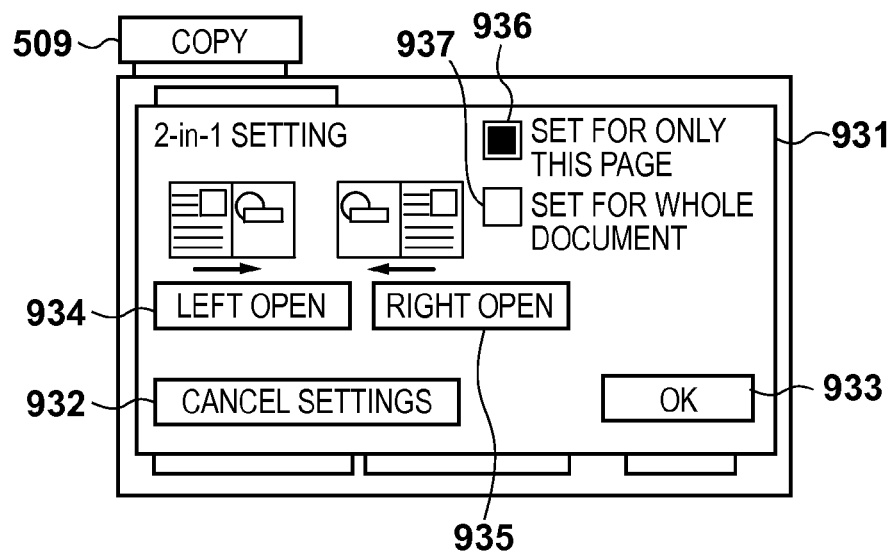

Upon detecting that the user has selected the selection item (2-in-1) 813 in the menu 811 shown in FIG. 8B, the main controller 211 displays a 2-in-1 setting screen 931 shown in FIG. 9B. The user selects one of a left open button 934 and a right open button 935, thereby setting whether to arrange the pages in the order of left→right or arrange the pages in the order of right→left. Buttons 936 and 937 are used to set whether to apply the 2-in-1 setting to only the operated page or all the scanned images. When the user presses a setting cancel button 932, the 2-in-1 setting is canceled, and the screen returns to the preview screen. When the user presses an OK button 933, the 2-in-1 menu setting is determined and reflected on printing. Although the 2-in-1 setting screen is displayed here, N-in-1 setting may be done in general.

Processing of the main controller 211 upon detecting the pinch-in gesture shown in FIG. 8A will be described next with reference to the flowchart of FIG. 10.

Figure 10:
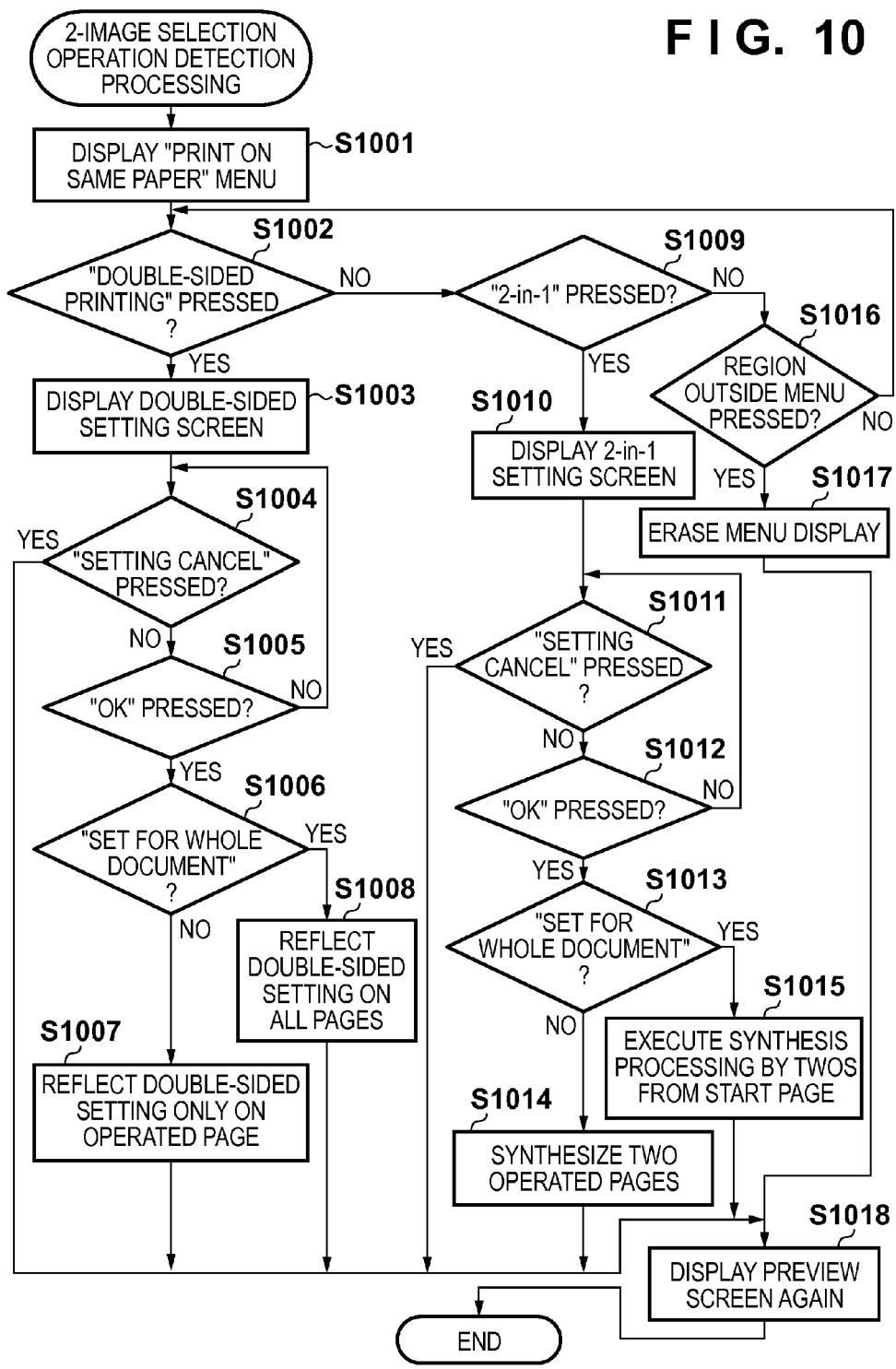
FIG. 10 is a flowchart for explaining processing when the image forming apparatus according to the first embodiment has detected the pinch-in gesture shown in FIG. 8A.

FIG. 10 is a flowchart for explaining processing when the image forming apparatus according to the first embodiment has detected the pinch-in gesture shown in FIG. 8A. Note that the program used to execute this processing is stored in a ROM 220 and executed under the control of a CPU 212 of the main controller 211. The pinch-in is a gesture in which the user designates (touches) a plurality of images arranged at separate positions by fingers and drags the images to make them close to each other.

This processing starts upon detecting the gesture shown in FIG. 8A. In step S1001, the "print on same paper" menu 811 shown in FIG. 8B is displayed. In step S1002, it is determined whether the user has pressed the selection item 812 (double-sided setting) of the menu 811. If NO in step S1002, the process advances to step S1009 to determine whether the user has pressed the selection item 813 (2-in-1 setting). If NO in step S1009, the process advances to step S1016 to determine whether the user has pressed a portion outside the region of the menu 811. If NO in step S1016, the process returns to step S1002 to wait for user input on a UI display unit 151. Upon detecting in step S1016 that the user has pressed a region outside the menu, the main controller determines that the user has canceled selection from the menu. The process then advances to step S1017 to erase the display of the menu 811. The process then advances to step S1018 to display the preview screen shown in FIG. 5B again, and the setting processing is completed.

On the other hand, upon detecting ins step S1002 that the user has pressed the selection item 812 (double-sided setting), the process advances to step S1003 to display, for example, the double-sided setting screen 921 shown in FIG. 9A. Next, the process advances to step S1004. Upon detecting that the user has pressed the setting cancel button 922, the process advances to step S1018 to erase the double-sided setting screen 921 and display the preview screen shown in FIG. 5B again, and the setting processing is completed.

If setting cancel has not been input in step S1004, the process advances to step S1005 to determine whether the user has pressed the OK button 923. If NO in step S1005, the process returns to step S1004 to wait for user input. Upon determining in step S1005 that the user has pressed the OK button 923, the process advances to step S1006 to determine whether the user has checked the button 927, that is, whether to "set for whole document". If NO in step S1006, the process advances to step S1007 to reflect the double-sided setting on only the images of the two pages on which the fingers have been placed in FIG. 8A. Reflecting the double-sided setting is done by updating the double-sided setting item of the image attribute/print setting file saved in association with the image data on an HD drive 232.

If "set for whole document" is selected in step S1006, the process advances to step S1008 to reflect the double-sided setting on all pages starting from the first page of the scanned images, as in step S1007, that is, update the double-sided setting of the image attribute/print setting file. When the processing in step S1007 or S1008 is thus performed, the process advances to step S1018 to rerender the preview screen shown in FIG. 5B, and the setting processing ends.

Upon detecting in step S1009 that the user has pressed the selection item 813 (2-in-1 setting), the process advances to step S1010, and the main controller 211 displays, for example, the 2-in-1 setting screen 931 shown in FIG. 9B. Processes in steps S1011 and S1012 are acceptance of a user operation and determination of press of the setting cancel button 932 and the OK button 933, as in steps S1004 and S1005. As long as NO in both of steps S1011 and S1012, user input is waited. Upon determining in step S1012 that the user has pressed the OK button 933, the process advances to step S1013 to determine whether the user has checked the button 937, that is, whether to "set for whole document". If NO in step S1013, the process advances to step S1014 to perform processing of synthesizing the two images selected by the operation of FIG. 8A. If "set for whole document" is selected in step S1013, the process advances to step S1015 to execute the same synthesis processing as in step S1014 for all pages. Note that the processing contents of steps S1014 and S1015 will be described later. When the processing in step S1014 or S1015 is thus completed, the process advances to step S1016 to erase the 2-in-1 setting menu 931 and display the preview screen shown in FIG. 5B. At this time, the image after the synthesis can be previewed because the data after 2-in-1 synthesis is read out from the HD drive 232 as the image data of each page.

Figure 11A:
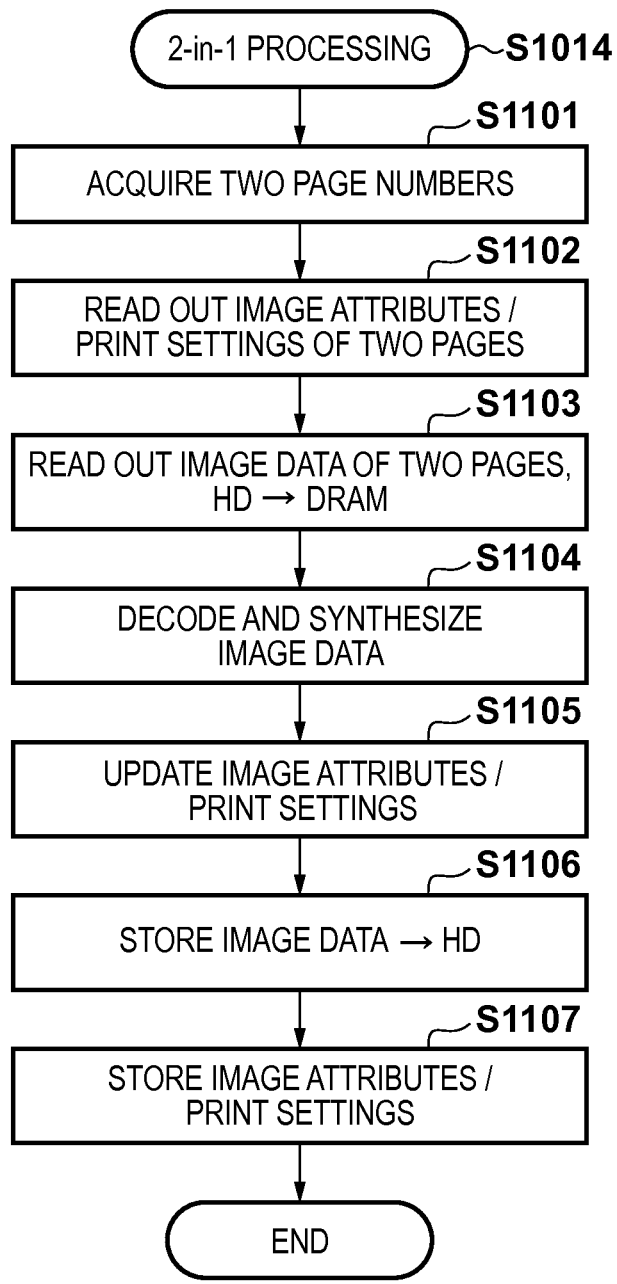
FIGS. 11A and 11B are flowcharts for explaining details of 2-in-1 synthesis processing in steps S1014 and S1015 of FIG. 10.
Figure 11B:
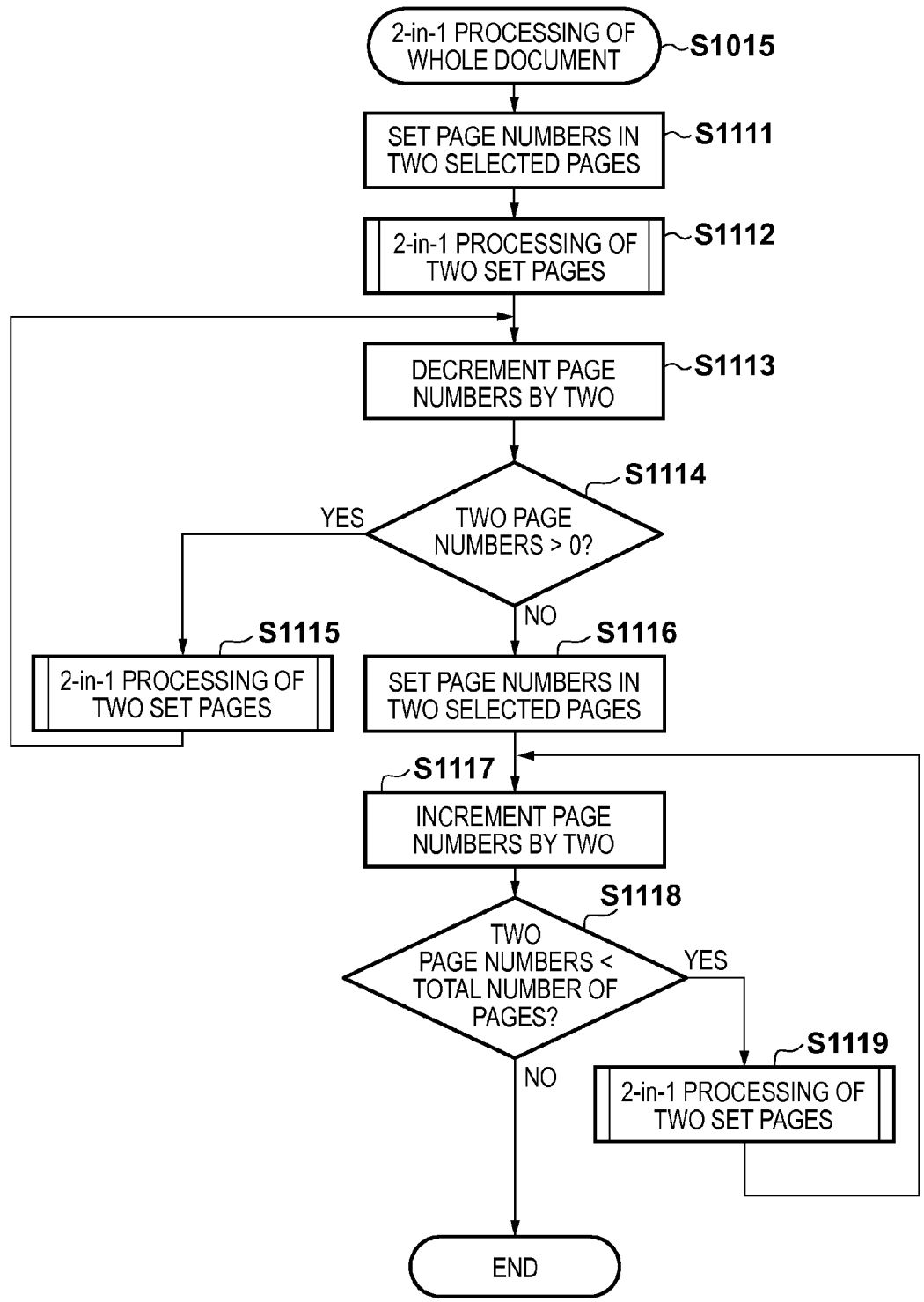

FIGS. 11A and 11B are flowcharts for explaining details of 2-in-1 synthesis processing in steps S1014 and S1015 of FIG. 10. FIG. 11A illustrates 2-in-1 processing of only two designated pages, which is executed in step S1014. FIG. 11B illustrates 2-in-1 processing of the whole document, which is executed in step S1015.

When the 2-in-1 processing starts in step S1014, in step S1101, the two designated page numbers are acquired and set as the process target pages. The process advances to step S1102 to identify the image attribute/print setting files on the HD drive 232 based on the two acquired page numbers and read out them to a DRAM 222. The process then advances to step S1103 to identify the images files stored in the HD drive 232 based on the two page numbers and read out them to the DRAM 222. The process then advances to step S1104 to decode the two readout image data, synthesize the horizontally arrayed image data on the DRAM 222, and JPEG-encode the synthesized data. The synthesis order complies with the setting of the left open button 934 or the right open button 935. The process then advances to step S1105 to update the image attributes/print settings. The image attributes changed here are the numbers of vertical and horizontal pixels. Since the paper size optimum for output may also change in accordance with the changes in the numbers of pixels, the paper size is also changed. For example, when A4 images are synthesized by 2-in-1 processing, the paper size is changed to A3. The process then advances to step S1106 to transfer the image data synthesized in step S1104 from the DRAM 222 to the HD drive 232 and store the image data. The process then advances to step S1107 to transfer the image attributes/print settings updated in step S1105 to the HD drive 232 and store the image attributes/print settings. The data stored in the HD drive 232 in steps S1106 and S1107 are associated with each other using file names, as described concerning the scan processing shown in FIG. 3A.

The processing in step S1015 of FIG. 10 will be described next with reference to the flowchart of FIG. 11B.

When the 2-in-1 processing of the whole document starts in step S1015 of FIG. 10, in step S1111, the numbers of the two pages designated by the operation of FIG. 8A are set as the processing page numbers. The process then advances to step S1112 to execute 2-in-1 synthesis processing of only the two set pages. In this case, the processes in steps S1101 to S1107 of FIG. 11A are executed. The process then advances to step S1113 to decrement the processing page numbers by "2". That is, two preceding pages are set as the processing page numbers. The process then advances to step S1114 to determine whether both of the two page numbers after the decrement are larger than "0", that is, whether processing has ended up to the first page. If both of the two page numbers are larger than "0" in step S1114, the process advances to step S1115 to execute 2-in-1 processing of the two pages set in step S1113. The processing contents in step S1115 are also the same as those in steps S1101 to S1107 of FIG. 11A. When the processing in step S1115 is thus completed, the process returns to step S1113 to further decrement the page numbers by "2" and execute 2-in-1 synthesis processing of the preceding pages.

If both of the two page numbers are smaller than "0" in step S1114, that is, the processing has ended up to the first page, the process advances to step S1116 to return the page numbers to those in the processing start state, that is, the page numbers designated by the operation of FIG. 8A. The process then advances to step S1117 to increment the processing page numbers by "2". That is, 2-in-1 processing of the two pages next to those designated by the operation of FIG. 8A starts. The process then advances to step S1118 to compare the page numbers with the total number of pages and determine whether both numbers are smaller than the total number of pages, that is, the processing has ended up the end of the document. If the processing has not ended in step S1118, the process advances to step S1119 to execute 2-in-1 processing of the two pages set in step S1117. The processing contents in step S1119 are also the same as those in steps S1101 to S1107 of FIG. 11A. When the processing in step S1119 is thus completed, the process returns to step S1117 to further increment the page numbers by "2" and execute 2-in-1 synthesis processing of the subsequent pages. The processes in steps S1117 to S1119 are executed until NO in step S1118, thereby performing 2-in-1 processing up to the end of the document. If NO in step S1118, the 2-in-1 processing of the whole document ends.

After the processing shown by the flowchart of FIG. 10, upon detecting that the user has pressed the print start button 528 shown in FIG. 5B, the main controller 211 executes print processing in accordance with the processing of the flowchart in FIG. 4 described above. As described above, it is possible to set double-sided printing or 2-in-1 printing of printing two images on one paper sheet (sheet) by an intuitive operation of "designating two images simultaneously". Note that in this embodiment, an example has been described in which the menu 811 is displayed upon detecting that the user has performed the operation (pinch-in) of making a plurality of images displayed at separate positions close to each other. However, the present invention is not limited to this. For example, the settings may be done such that upon detecting that the user has performed the operation (pinch-in) of making a plurality of images displayed at separate positions close to each other, the plurality of images are printed on one paper sheet (sheet) without displaying the menu 811.

Second Embodiment

The second embodiment for carrying out the present invention will be described below. In the above-described first embodiment, settings for printing two designated images on a single paper sheet are presented to the user. Although the processing can be performed even when the two images have different sizes, a satisfactory printing result can be obtained when the two images have the same size. In the second embodiment, however, if the two images designated by the user have different sizes, an alternative, that is, a menu to print the two images in equal size is displayed to obtain a more preferably printing result. Note that the hardware arrangement of the image forming apparatus according to the second embodiment is the same as that of the image forming apparatus according to the above-described first embodiment, and a description thereof will be omitted.

FIGS. 12A to 13B are views showing examples of operation screens according to the second embodiment. Note that the same reference numerals as in FIGS. 5A, 5B, and 5C of the above-described first embodiment denote the same parts in FIGS. 12A to 13B. The outline of a user operation when designating two images of different sizes and operation screens displayed by a main controller 211 will be described with reference to these drawings. A description will be made below assuming that an image 522 of A4 size and an image 523 of A3 size are designated, as in FIG. 12A.

Figure 12A:
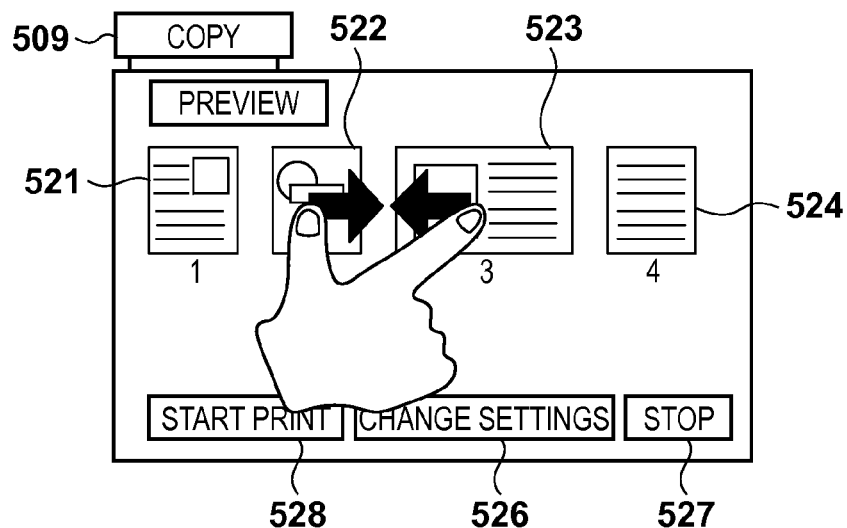
FIGS. 12A and 12B are views showing examples of operation screens according to the second embodiment.

Referring to FIG. 12A, the user performs an operation (pinch-in) of simultaneously touching the images 522 and 523 by the thumb and the index finger, respectively, and making the tips of the thumb and the index finger close to each other while keeping them touching. Upon detecting this operation, the main controller 211 displays a setting menu.

Figure 12B:
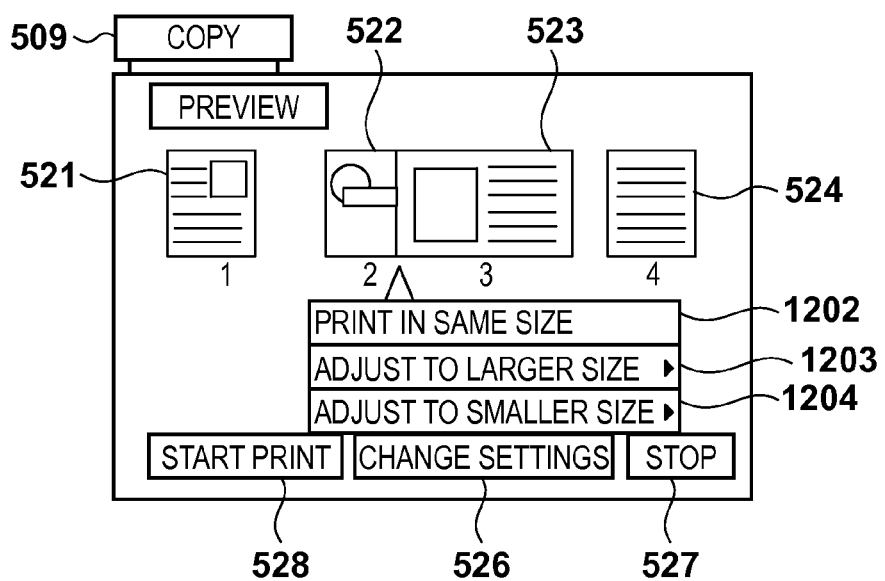
Figure 13A:
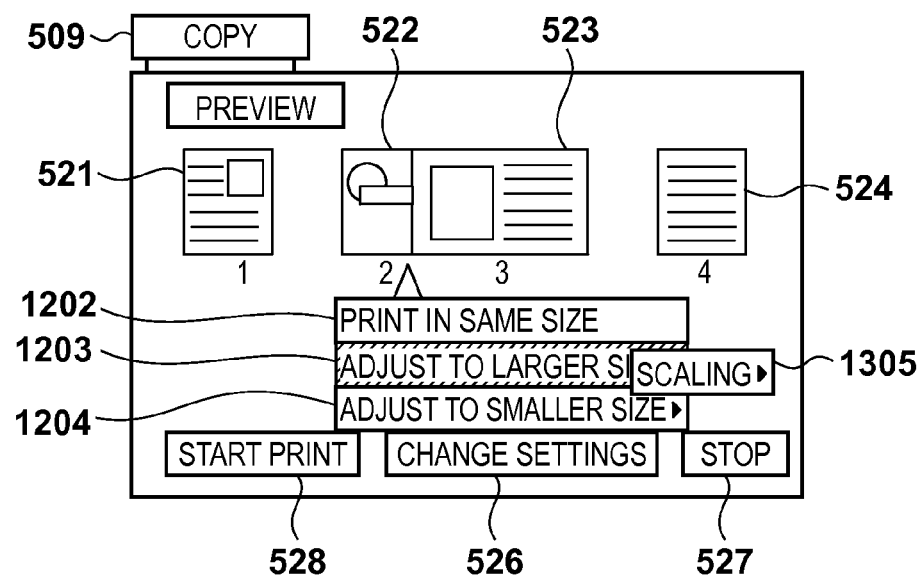
FIGS. 13A and 13B are views showing examples of operation screens according to the second embodiment.

FIG. 12B shows a screen displayed upon detecting the operation in FIG. 12A. In this case, a menu 1202 or set "print in same size" is displayed. A menu 1203 is a setting menu to output the images adjusted to the larger paper size, in this case, the A3 size of the image 523. On the other hand, a menu 1204 is a setting menu to output the images adjusted to the smaller paper size, in this case, the A4 size of the image 522. When the user presses the "adjust to larger size" menu 1203 on the screen shown in FIG. 12B, a scaling menu 1305 is displayed, as shown in FIG. 13A. When the user presses the "adjust to smaller size" menu 1204 on the screen shown in FIG. 12B, a scaling menu 1306 and, if possible by the combination of the paper sizes of the two designated pages, a z-folding menu 1307 is displayed, as shown in FIG. 13B.

A screen 1411 shown in FIG. 14A is a scaling setting screen displayed when the user has pressed the scaling menu 1305 or 1306. A region 1416 is a scaling ratio setting region where both numerical value input using keys and standard scaling ratio setting by the paper size (in the screen shown in FIG. 14A, a standard reduction ratio of 70% from A3 to A4 is displayed) can be performed. A region 1417 indicates a rotation setting for rotating an image in a set direction. For example, to change an A3 landscape image to an A4 portrait image, 70% reduction is set in the scaling ratio setting region 1416, and clockwise rotation or counterclockwise rotation is set in the rotation setting region 1417. Buttons 1414 and 1415 are used to select whether to apply the settings done in the scaling ratio setting region 1416 and the rotation setting region 1417 to only the pages operated in FIG. 12A or all the scanned images. When the user presses a setting cancel button 1412, the scaling setting is canceled, and the screen returns to the preview screen. When the user presses an OK button 1413, the scaling setting is determined and reflected on printing.

Figure 13B:
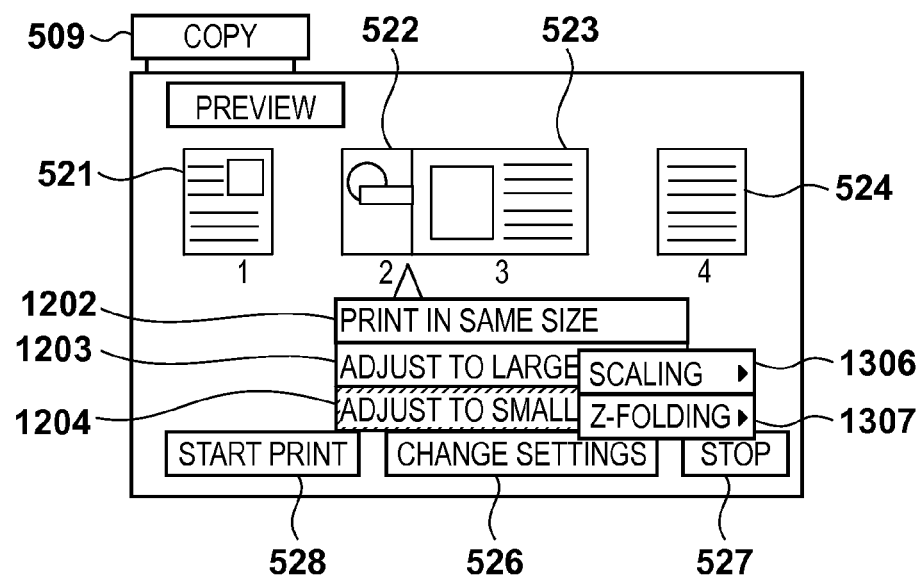

A screen 1421 shown in FIG. 14B is a z-folding setting screen displayed when the user has pressed the z-folding menu 1307 (FIG. 13B). As for the z-folding, once the paper size is decided, other settings are unnecessary. Buttons 1424 and 1425 are used to select whether to apply the z-folding setting to only the pages operated in FIG. 12A or all the scanned images. When the user presses a setting cancel button 1422, the z-folding setting is canceled, and the screen returns to the preview screen. When the user presses an OK button 1423, the z-folding setting is determined and reflected on printing.

Details of processing of the main controller 211 upon detecting an image selection operation by pinch-in shown in FIG. 12A will be described next with reference to the flowcharts of FIGS. 15 to 20.

Figure 15:
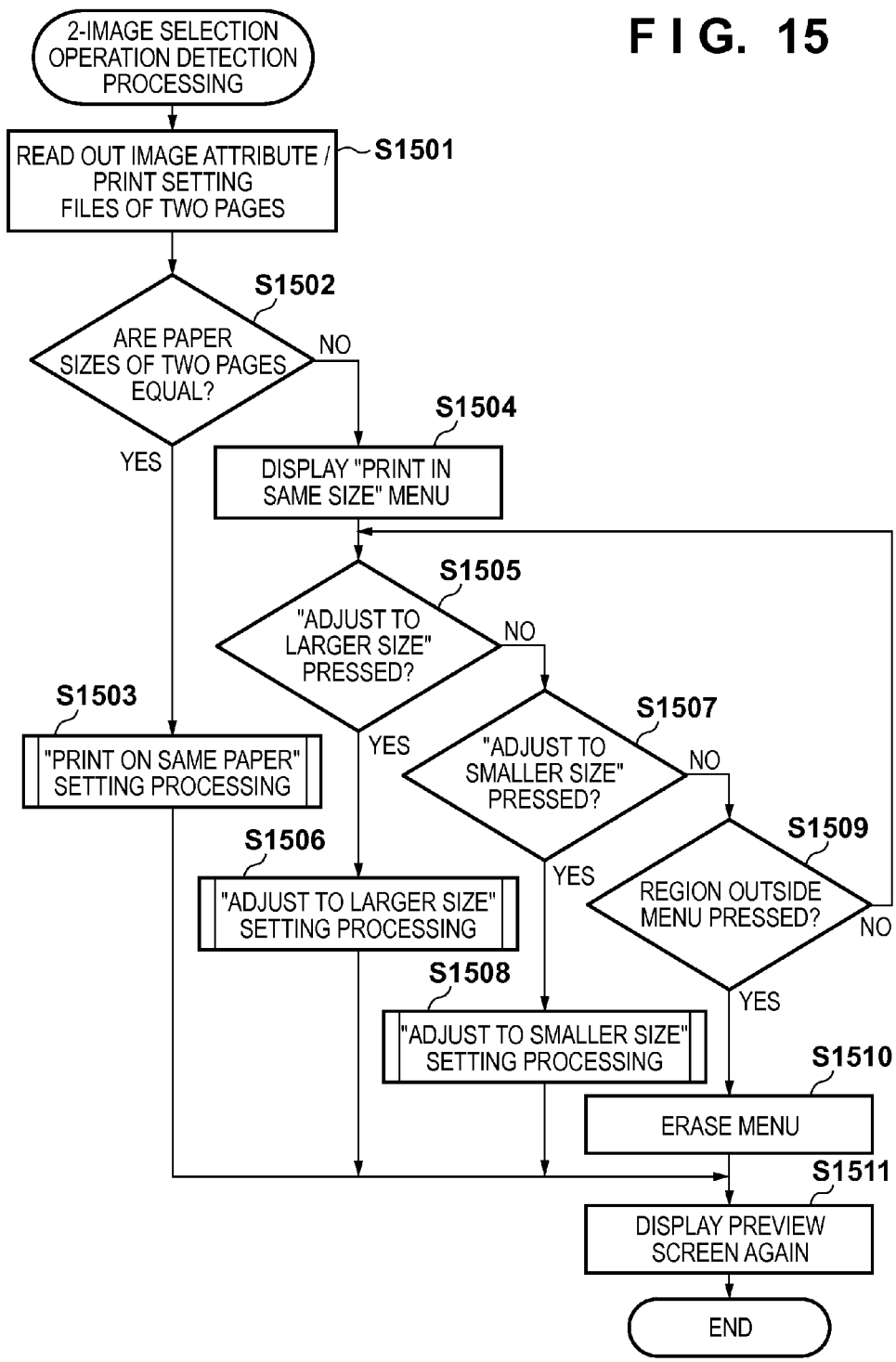
FIG. 15 is a flowchart for explaining processing of an image forming apparatus according to the second embodiment.

FIG. 15 is a flowchart for explaining processing of the image forming apparatus according to the second embodiment. FIG. 15 shows processing from detection of the image selection operation by pinch-in shown in FIG. 12A to display of a setting menu corresponding to the operation and completion of the setting. Note that the program used to execute this processing is stored in a ROM 220 and executed under the control of a CPU 212 of the main controller 211.

In step S1501, the image attribute/print setting files of pages corresponding to two images on which two fingers have been placed are read out from an HD drive 232. The process then advances to step S1502 to acquire the paper sizes from the readout print settings and determine whether the two pages have the same paper size. If the two pages have the same paper size, the process advances to step S1503 to display the "print on same paper" menu and perform setting processing. The processing in step S1503 is the same as the processes shown in the flowcharts of FIGS. 10, 11A, and 11B described in the first embodiment, and a description of the processing contents will be omitted. When the processing in step S1503 is completed, the process advances to step S1511 to display the preview screen again, and the setting processing ends.

On the other hand, if the two images selected by the operation shown in FIG. 12A have different paper sizes in step S1502, the process advances to step S1504 to display the screen shown in FIG. 12B. That is, the "print in same size" menu 1202 is displayed. The process then advances to step S1505 to determine whether the user has pressed the "adjust to larger size" menu 1203. Upon determining in step S1505 that the user has pressed the "adjust to larger size" menu 1203, the process advances to step S1506 to perform corresponding setting processing. The processing contents in step S1506 will be described later. When the setting processing in step S1506 is completed, the process advances to step S1511 to display the preview screen again, and the setting processing ends.

If the user has not pressed the "adjust to larger size" in step S1505, the process advances to step S1507 to determine whether the user has pressed the "adjust to smaller size" menu 1204. Upon determining in step S1507 that the user has pressed the "adjust to smaller size" menu 1204, the process advances to step S1508 to perform corresponding setting processing. The processing contents in step S1508 will be described later. When the setting processing in step S1508 is completed, the process advances to step S1511 to display the preview screen again, and the setting processing ends.

If the user has not pressed the "adjust to smaller size" in step S1507, the process advances to step S1509 to determine whether the user has pressed a region outside the menu on a UI display unit 151. If NO in step S1509, the process returns to step S1505 to repeat the above-described processing and wait for a user input operation. Upon determining in step S1509 that the user has pressed a region outside the menu on the UI display unit 151, the operation is interpreted as a menu selection cancel operation. The process then advances to step S1510 to erase the display of the menu 1202. The preview screen is displayed again in step S1511, and the setting processing ends.

Figure 16:
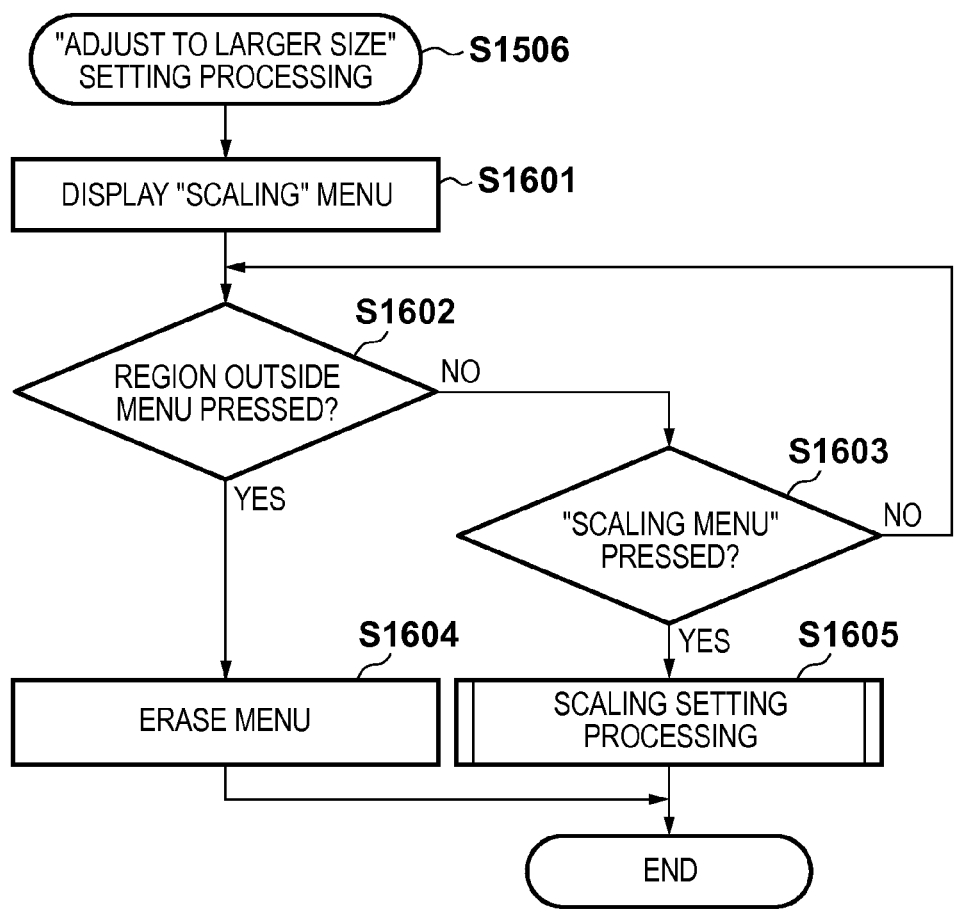
FIG. 16 is a flowchart for explaining processing in step S1506, that is, "adjust to larger size" in FIG. 15.

FIG. 16 is a flowchart for explaining processing in step S1506, that is, "adjust to larger size" in FIG. 15.

When the process advances to step S1506, in step S1601, the screen in FIG. 13A is displayed, and the scaling menu 1305 is displayed. The process then advances to step S1602 to determine whether the user has pressed a region outside the menu on the UI display unit 151. If YES in step S1602, the process advances to step S1604. Interpreting the operation as a menu selection cancel operation by the user, the menus 1305 and 1202 are erased, and the processing is completed.

On the other hand, if the user has pressed a region within the menu on the UI display unit 151 in step S1602, the process advances to step S1603 to determine whether the user has pressed the scaling menu 1305. If the user has pressed the scaling menu in step S1603, the process advances to step S1605 to execute scaling setting processing. The processing contents in step S1605 will be described later. When the scaling setting processing in step S1605 is completed, the processing in step S1506 is also completed. If NO in both of steps S1602 and S1603, the process returns to step S1602 to repeat the above-described determination and wait for user input.

Figure 17:
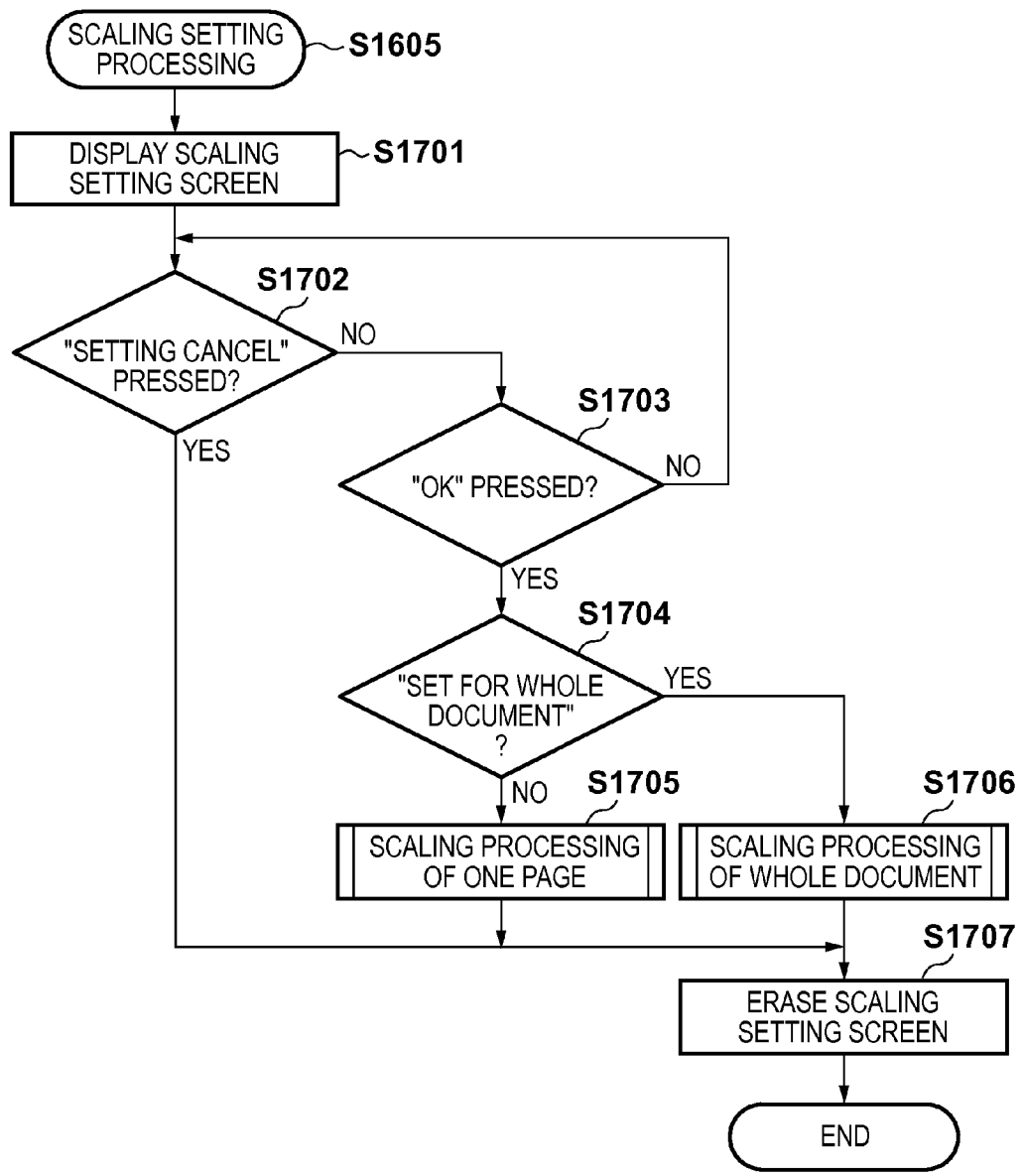
FIG. 17 is a flowchart for explaining the contents of scaling setting processing in step S1605 of FIG. 16.

FIG. 17 is a flowchart for explaining the contents of the scaling setting processing in step S1605 of FIG. 16.

When the process advances to the scaling setting processing in step S1605, the process advances to step S1701 to display the scaling setting screen 1411 shown in FIG. 14A. The process then advances to step S1702 to determine whether the user has pressed the setting cancel button 1412. In step S1703, it is determined whether the user has pressed the OK button 1413. If NO in both of steps S1702 and S1703, steps S1702 and S1703 are repeated to wait for user input. Upon detecting in step S1702 that the user has pressed the setting cancel button 1412, the process advances to step S1707 without performing the scaling setting processing to erase the scaling setting screen 1411, and the processing ends.

On the other hand, upon detecting in step S1703 that the user has pressed the OK button 1413, the process advances to step S1704 to whether the user has checked the "set for whole document" button 1414. If NO in step S1704, the process advances to step S1705 to perform scaling processing of only the designated page. If YES in step S1704, the process advances to step S1706 to perform scaling processing of the whole document. The processing contents in steps S1705 and S1706 will be described later. When the processing in step S1705 or S1706 is completed, the process advances to step S1707 to erase the scaling setting screen 1411, and the scaling setting processing ends.

Figure 18A:
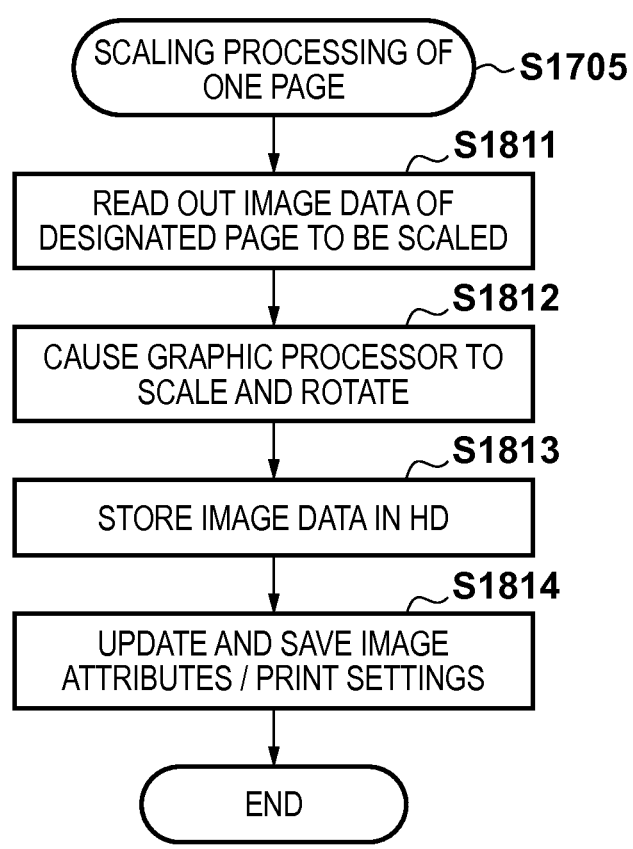
FIG. 18A is a flowchart for explaining the contents of scaling processing of one page in step S1705 of FIG. 17.

FIG. 18A is a flowchart for explaining the contents of scaling processing of one page in step S1705 of FIG. 17.

In step S1811, the image data of the designated page to be scaled is read out from a file stored in the HD drive 232 and transferred to a DRAM 222. Since this is setting processing from the "adjust to larger size" menu, the designated page is the page of an image having a smaller paper size out of the two images selected by the user. For example, in the operation shown in FIG. 12A, the designated page is of the image 522. Next, the process advances to step S1812 to transfer the readout image data to a graphic processor 251. The graphic processor 251 rasterizes the transferred image data, scales the image data in accordance with the setting in the scaling ratio setting region 1416 shown in FIG. 14A, and rotates the image data in accordance with the setting in the rotation setting region 1417. The graphic processor 251 compresses the image data and transfers it to the DRAM 222, thus completing the image data scaling processing. The process then advances to step S1813 to transfer the image data that has undergone the scaling processing from the DRAM 222 to the HD drive 232 and store the image data. The process then advances to step S1814 to update the data of the image attribute/print setting file corresponding to the image data. The data updated here are the numbers of vertical and horizontal pixels and the paper size, which have been changed by the scaling and rotation. When the processing in step S1814 has ended, the scaling processing of one page in step S1705 is completed.

Figure 18B:
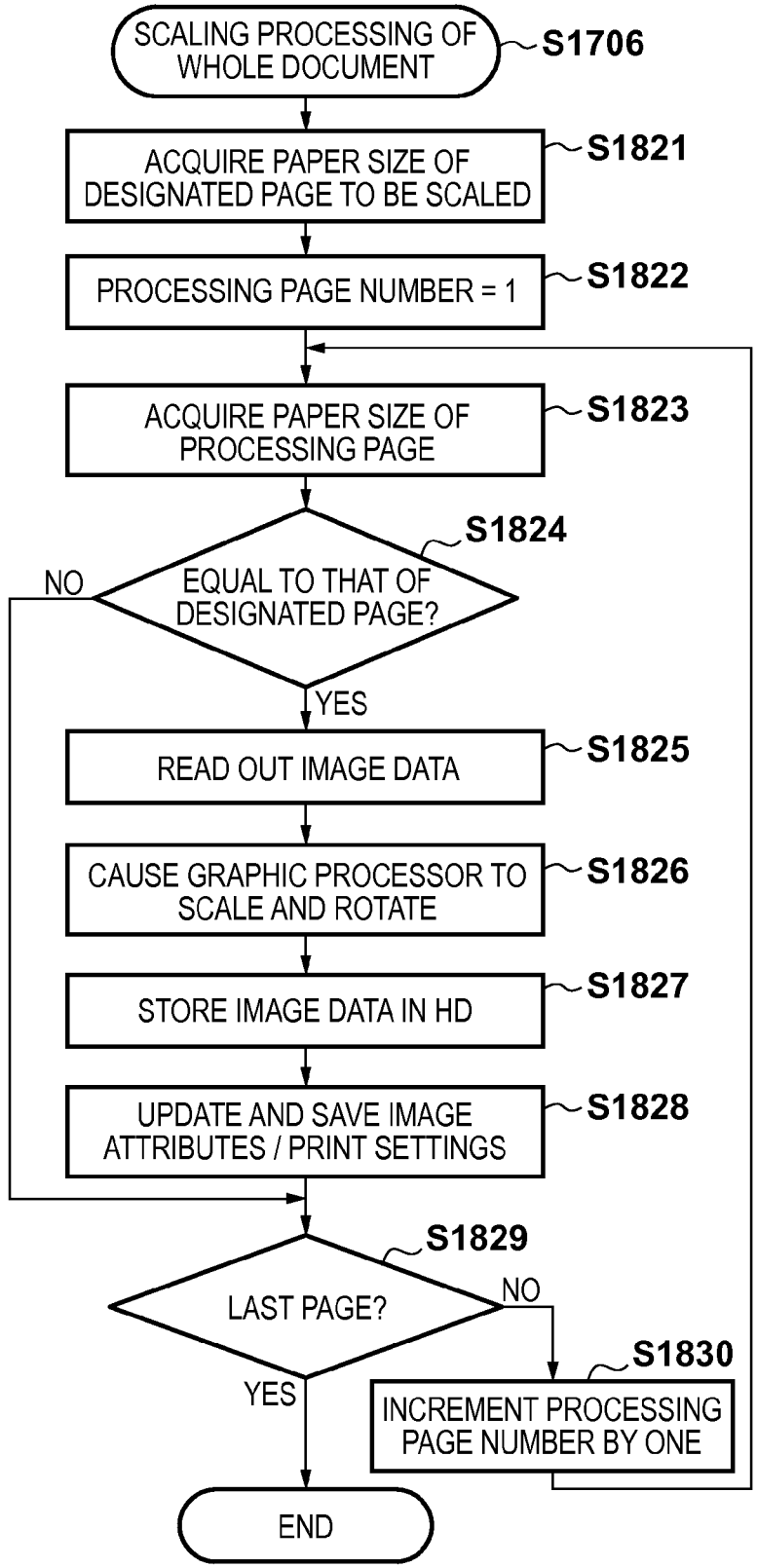
FIG. 18B is a flowchart for explaining the contents of scaling processing of a whole document in step S1706 of FIG. 17.

FIG. 18B is a flowchart for explaining the contents of scaling processing of a whole document in step S1706.

In step S1821, the paper size designated by the user is acquired from the image attribute/print setting file. The designated page in step S1821 is a page having a smaller paper size out of the two pages designated by the user, as described concerning step S1811. The process then advances to step S1822 to set the processing page number to "1", that is, start processing from the first page. The process then advances to step S1823 to acquire the paper size from the print setting file of the processing page number. In step S1824, the paper size acquired in step S1821 is compared with the paper size acquired in step S1823. If the paper sizes are the same, the process advances to step S1825. Otherwise, the process advances to step S1829. In step S1825, the image data of the processing page number is read out from the HD drive 232 to the DRAM 222. The process then advances to step S1826 to transfer the image data to the graphic processor 251 and perform scaling/rotation processing. The processing executed here is the same as that described concerning step S1812, and a description thereof will be omitted.

The process then advances to step S1827 to transfer the image data that has undergone the scaling/rotation processing from the DRAM 222 to the HD drive 232 and store the image data. The process then advances to step S1828 to update, out of the data in the image attribute/print setting file of the processing page number, the portions of the numbers of vertical and horizontal pixels and the paper size and save them, as in step S1814. The process then advances to step S1829 to determine whether the processing page number indicates the last page. If the page is not the last, the process advances to step S1830 to increment the processing page number by one. The process then returns to step S1823 to execute processing of the next page. When the processing of the last page in step S1829 has ended, the scaling processing of the whole document ends.

If NO in step S1824, that is, if the paper size of the processing page number is different from the paper size of the designated page, the process advances to step S1829 without executing the scaling processing. Only pages having the same size as the designated page are thus scaled so that the size can be made equal to that of the larger one of the designated pages (in FIG. 12A, the image 522).

The "adjust to larger size" processing in step S1506 of FIG. 15 has been described above. Next, processing contents when the user has pressed the "adjust to smaller size" menu 1204 in step S1507 of FIG. 15 will be described with reference to the flowchart of FIG. 19.

Figure 19:
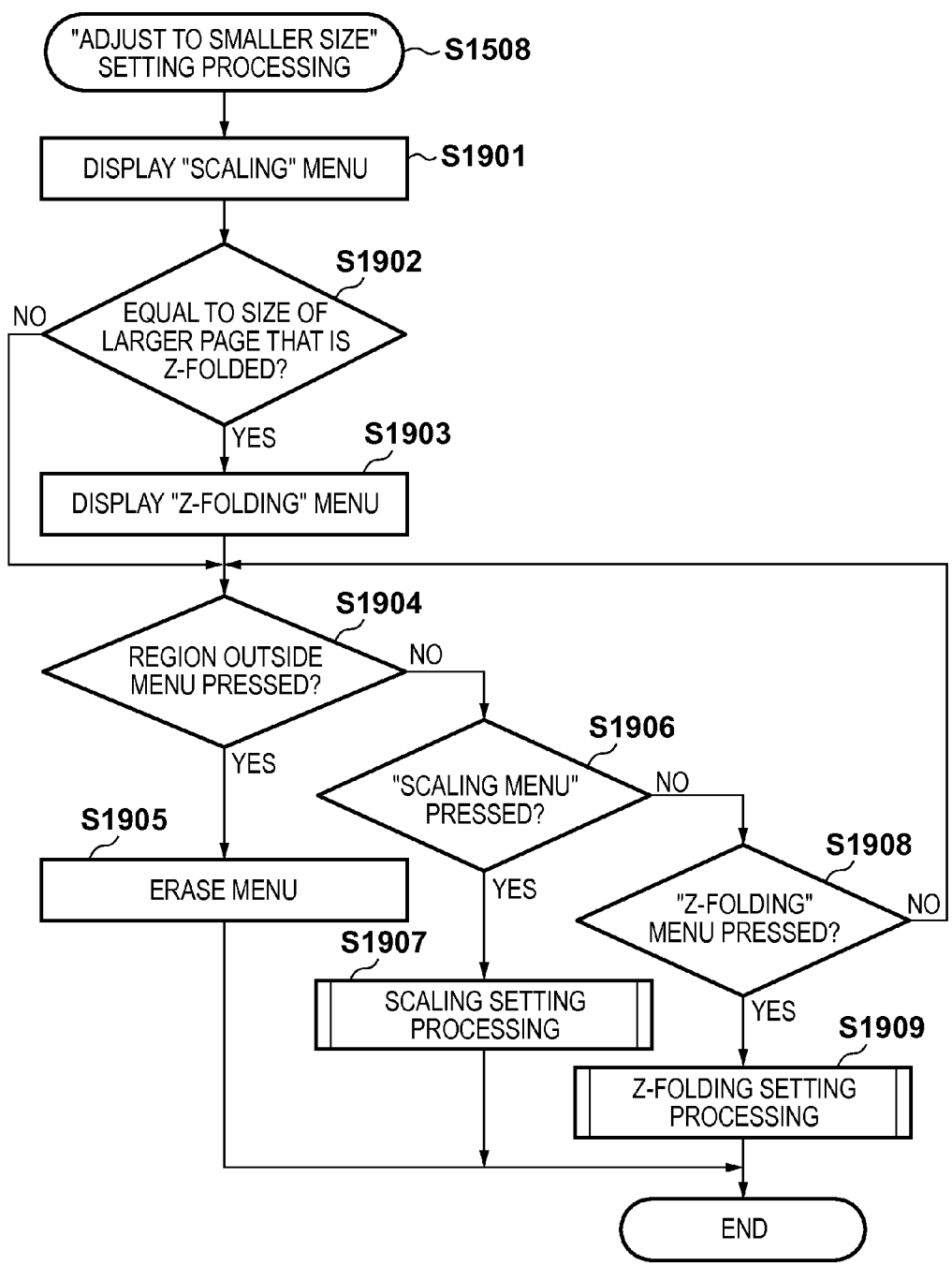
FIG. 19 is a flowchart for explaining processing in step S1508, that is, "adjust to smaller size" in FIG. 15.

FIG. 19 is a flowchart for explaining processing in step S1508, that is, "adjust to smaller size" in FIG. 15.

In steps S1901 to S1903, processing of displaying the screen shown in FIG. 13A is performed. First, in step S1901, the "scaling" menu 1306 is displayed. The process then advances to step S1902 to compare the paper sizes of the two images selected by the operation in FIG. 12A and determine whether the two output sizes match when the larger paper sheet is z-folded. In z-folding, a landscape paper sheet is folded into a half size to make its size match the size of a portrait paper sheet. More specifically, the determination in step S1902 ends with a YES when, for example, the smaller paper size is A4, and the larger paper size is A3, or when the smaller paper size is B5, and the larger paper size is B4. If YES in step S1902, the process advances to step S1903 to display the "z-folding" menu 1307. If NO in step S1902, the process advances to step S1904 without executing step S1903. Hence, the z-folding menu 1307 is not displayed.

In step S1904, it is determined whether the user has pressed a region outside the menu on the UI display unit 151. If the user has pressed a region outside the menu, the process advances to step S1905 to erase the display of the menu, and the processing ends. If the user has pressed the menu region, the process advances to step S1906 to determine whether the user has pressed the scaling menu 1306. If NO in step S1906 as well, the process advances to step S1908 to determine whether the user has pressed the "z-folding" menu 1307. If NO in step S1908 as well, the process returns to step S1904 to repeat the above-described processing and wait for user input. Note that if NO in step S1902, the z-folding menu 1307 is not displayed, and therefore, the determination in step S1908 always ends with NO.

If the user has pressed the scaling menu 1306 in step S1906, the process advances to step S1907 to execute scaling setting processing. The processing contents in step S1907 are the same as those performed when the user has pressed the "scaling" menu 1305 selected by pressing the "adjust to larger size" menu 1203, which have been described with reference to the flowcharts of FIGS. 18A and 18B, except the following point. That is, the processing is different only in that the page of image data read out in step S1811 or the page of the paper size acquired in step S1821 is the page having a larger paper size, reversely to the description of FIGS. 18A and 18B. When the scaling setting processing in step S1907 is completed, the "adjust to smaller size" setting processing also ends. If YES in step S1908, the process advances to step S1909 to execute z-folding setting processing. The processing contents in step S1909 will be described later. When the processing in step S1909 has ended, the "adjust to smaller size" setting processing ends.

Figure 20:
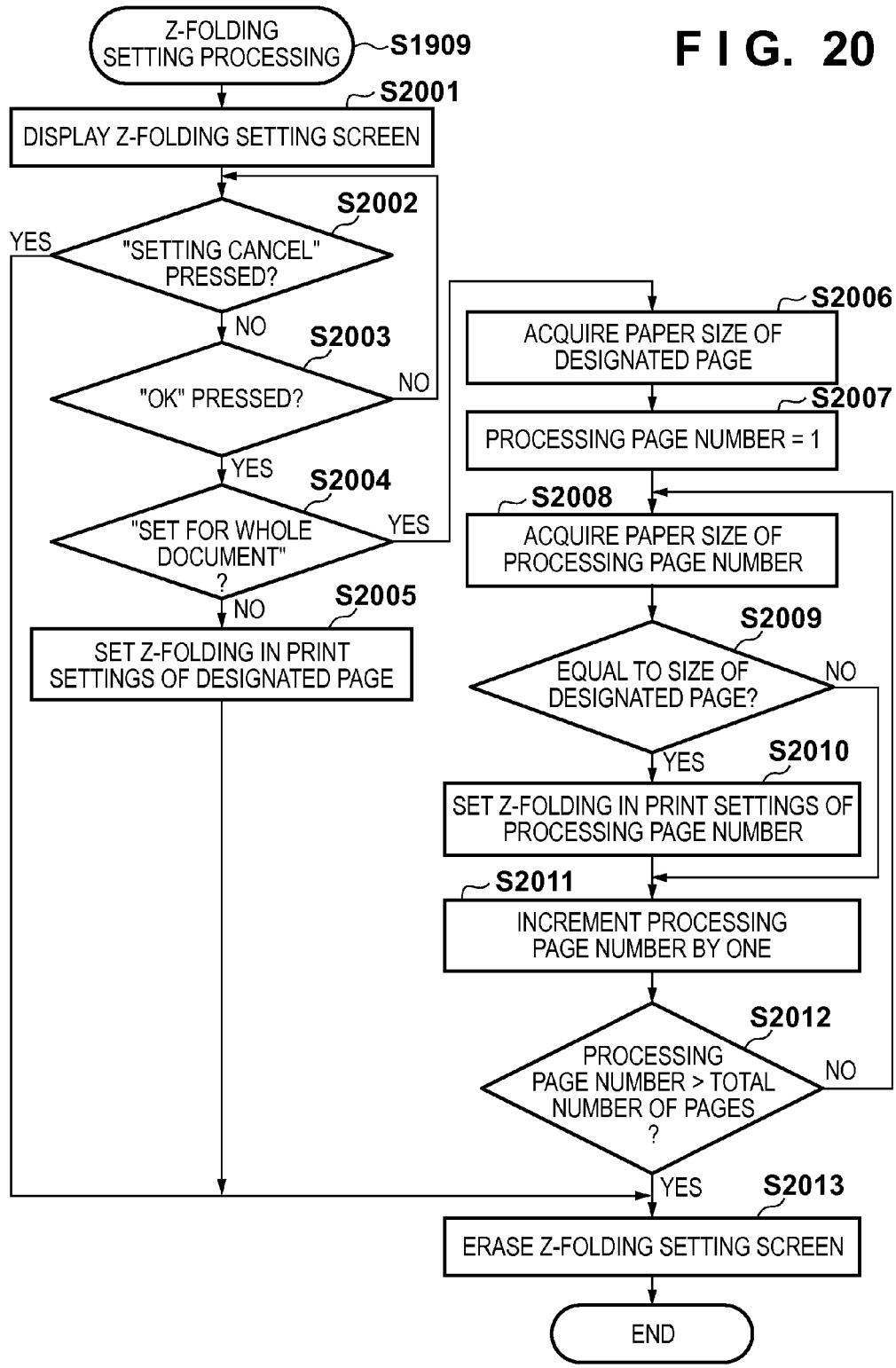
FIG. 20 is a flowchart for explaining processing in step S1909, that is, "z-folding setting processing" in FIG. 19.

FIG. 20 is a flowchart for explaining processing in step S1909, that is, "z-folding setting processing" in FIG. 19.

When the z-folding setting processing starts, in step S2001, the z-folding setting screen 1421 shown in FIG. 14B is displayed. The process then advances to step S2002 to determine whether the user has pressed the setting cancel button 1422. If the user has pressed the setting cancel button 1422, the process advances to step S2013 without performing z-folding setting to erase the z-folding setting screen 1421 and end the z-folding setting processing. If the user has not pressed the setting cancel button 1422 in step S2002, the process advances to step S2003 to determine whether the user has pressed the OK button 1423. If NO in step S2003, the process returns to step S2002 to wait for user input. If the user has pressed the OK button 1423 in step S2003, the process advances to step S2004 to determine whether the user has checked the "set for whole document" button 1425. If application to the whole document is not set, the process advances to step S2005 to rewrite the finishing item of the image attribute/print setting file of the designated page to z-folding and save the image attribute/print setting file. Performing z-folding at the time of printing the designated page is thus set. Note that the designated page to be z-folded is a page having a larger paper size out of the two pages designated by the operation in FIG. 12A.

On the other hand, if "set for whole document" is selected in step S2004, the process advances to step S2006 to do z-folding setting for the pages in the document. In step S2006, the larger paper size out of the designated pages for z-folding, that is, the two pages designated by the operation in FIG. 12A is acquired from the image attribute/print setting file. The process then advances to step S2007 to set "1" to the processing page number, that is, set starting processing from the first page of the document. The process then advances to step S2008 to acquire the paper size of the processing page number from the image attribute/print setting file of the processing page number. In step S2009, it is determined whether the paper size of the processing page number acquired in step S2008 is the same as the paper size of the designated page acquired in step S2006. Upon determining that the paper sizes are the same, the process advances to step S2010 to set z-folding in the finishing item of the image attribute/print setting file of the processing page number and save the image attribute/ print setting file, thereby setting z-folding. On the other hand, if NO in step S2009, the process advances to step S2011 while skipping processing in step S2010. Hence, z-folding is not set for a page whose size is different from the paper size of the designated page. That is, since z-folding is not set for a smaller one of the pages designated by the operation in FIG. 12A, the paper sizes are made equal. In step S2011, the processing page number is incremented by one to process the next page. The process then advances to step S2012 to determine whether the processing page number is larger than the total number of pages, that is, the processing has been performed for all pages of the document. If NO in step S2012, the process returns to step S2008 to continue processing of the next page. Upon determining in step S2012 that the processing is completed for all pages of the document, the process advances to step S2013 to erase the z-folding setting screen. The z-folding setting processing thus ends.

Presenting a setting menu concerning printing to the user and setting processing have been described for each of the case in which two images having the same size are selected, as shown in FIG. 8A, and the case in which two images having different sizes are selected, as shown in FIG. 12A. Changing the setting menu based on the combination of the sizes of images selected by the user yields the following effects. That is, when two images having the same size are selected, a menu according to the purpose of "printing on same paper" is presented to the user. This allows the user to intuitively do the print settings. When two images having different sizes are selected, and the two images are printed on the same paper, the larger image is printed while partially missing, or the surface on which the smaller image is printed has a large margin. It is therefore possible to prevent the user from erroneously doing such settings by prohibiting presentation of the "print on same paper" menu. In addition, when two images having different sizes are selected, a menu according to the purpose of "printing in same size" is presented to the user. This also allows the user to intuitively do the print settings.

Third Embodiment

The third embodiment for carrying out the present invention will be described below. The processing of the above-described first or second embodiment is executed when the user performs an operation of selecting two images, as shown in FIG. 8A or 12A. Especially in the second embodiment, the menu to be presented to the user is changed in accordance with the difference between the paper sizes of the two images designated by the user. On the other hand, when the user has performed an operation of designating only one image, the same effects as in the second embodiment can be obtained by causing a main controller 211 to detect the difference in the size between an image in a document and a designated image. Processing in this case will be described. Note that the hardware arrangement of the image forming apparatus according to the third embodiment is the same as that of the image forming apparatus according to the above-described first or second embodiment, and a description thereof will be omitted.

The outline of a user operation and operation screens displayed by the main controller 211 will be described with reference to FIGS. 21A to 22B.

Figure 21A:
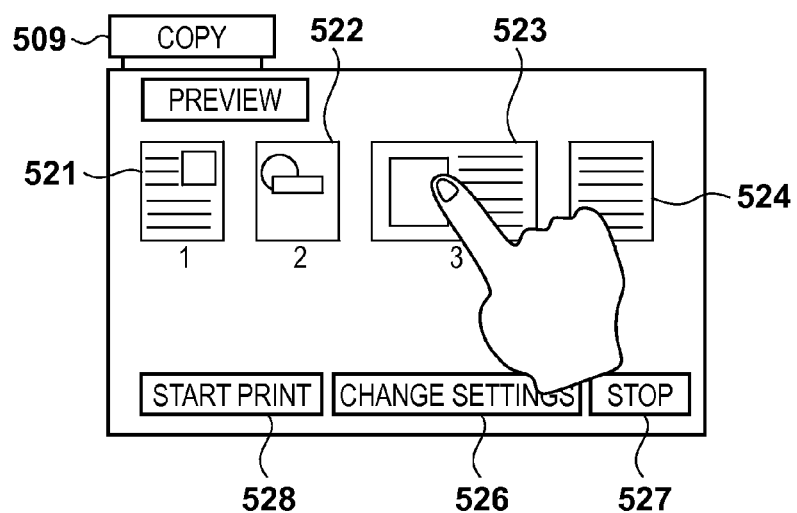
FIGS. 21A and 21B are views showing an example of a UI screen according to the third embodiment when a larger image is selected.
Figure 21B:
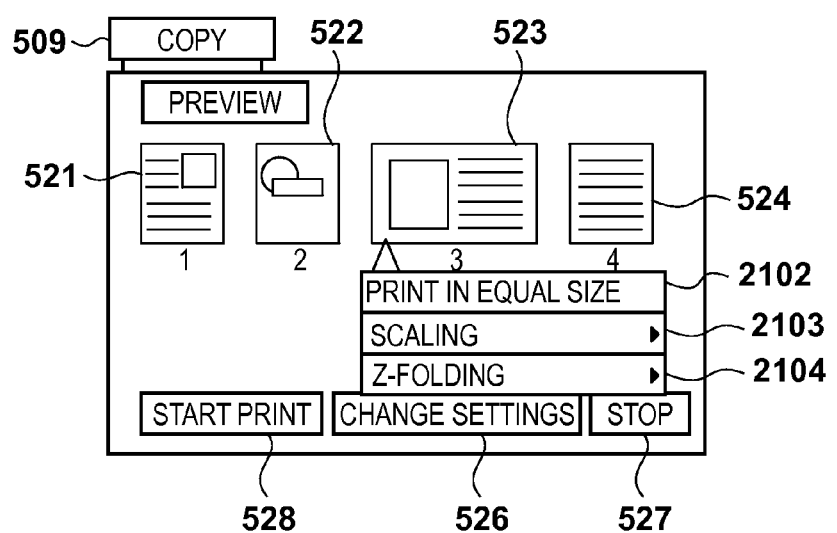

FIG. 21A is a view showing a state in which the user has touched a page having a large paper size in a document on the preview screen. At this time, the main controller 211 displays a "print in equal size" menu 2102, as shown in FIG. 21B. The "print in equal size" menu 2102 includes a scaling menu 2103 and a z-folding menu 2104. A screen displayed when the user has pressed the scaling menu 2103 is the same as the scaling setting screen 1411 shown in FIG. 14A. A screen displayed when the user has pressed the z-folding menu 2104 is the same as the z-folding setting screen 1421 shown in FIG. 14B.

Figure 22A:
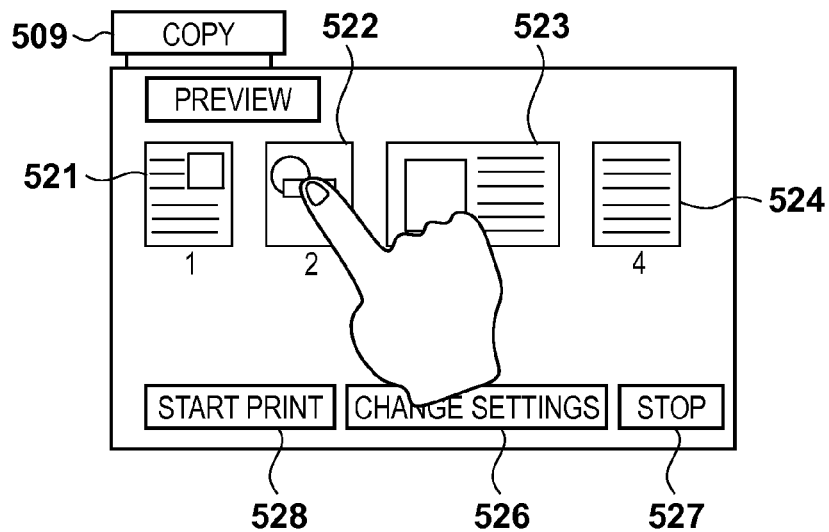
FIGS. 22A and 22B are views showing an example of a UI screen according to the third embodiment when a smaller image is selected.
Figure 22B:
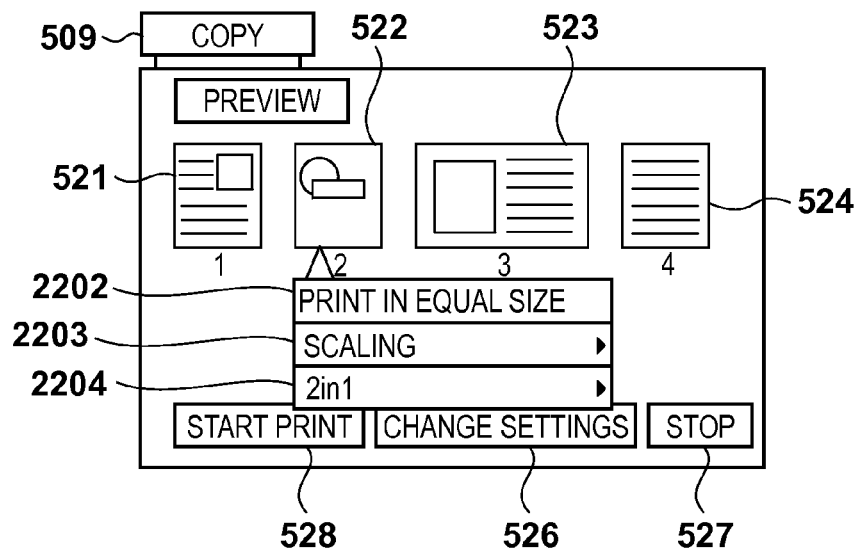

FIG. 22A is a view showing a state in which the user has touched a page having a small paper size in a document on the preview screen. At this time, the main controller 211 displays a "print in equal size" menu 2202, as shown in FIG. 22B. The "print in equal size" menu 2202 includes a scaling menu 2203 and a 2-in-1 menu 2204. A screen displayed when the user has pressed the scaling menu 2203 is the same as the scaling setting screen 1411 shown in FIG. 14A. A screen displayed when the user has pressed the 2-in-1 menu 2204 is the same as the 2-in-1 setting screen 931 shown in FIG. 9B.

Setting processing performed by the main controller 211 upon detecting an operation of selecting one image, as shown in FIGS. 21A and 22A, will be described next with reference to the flowcharts of FIGS. 23 to 25.

Figure 23:
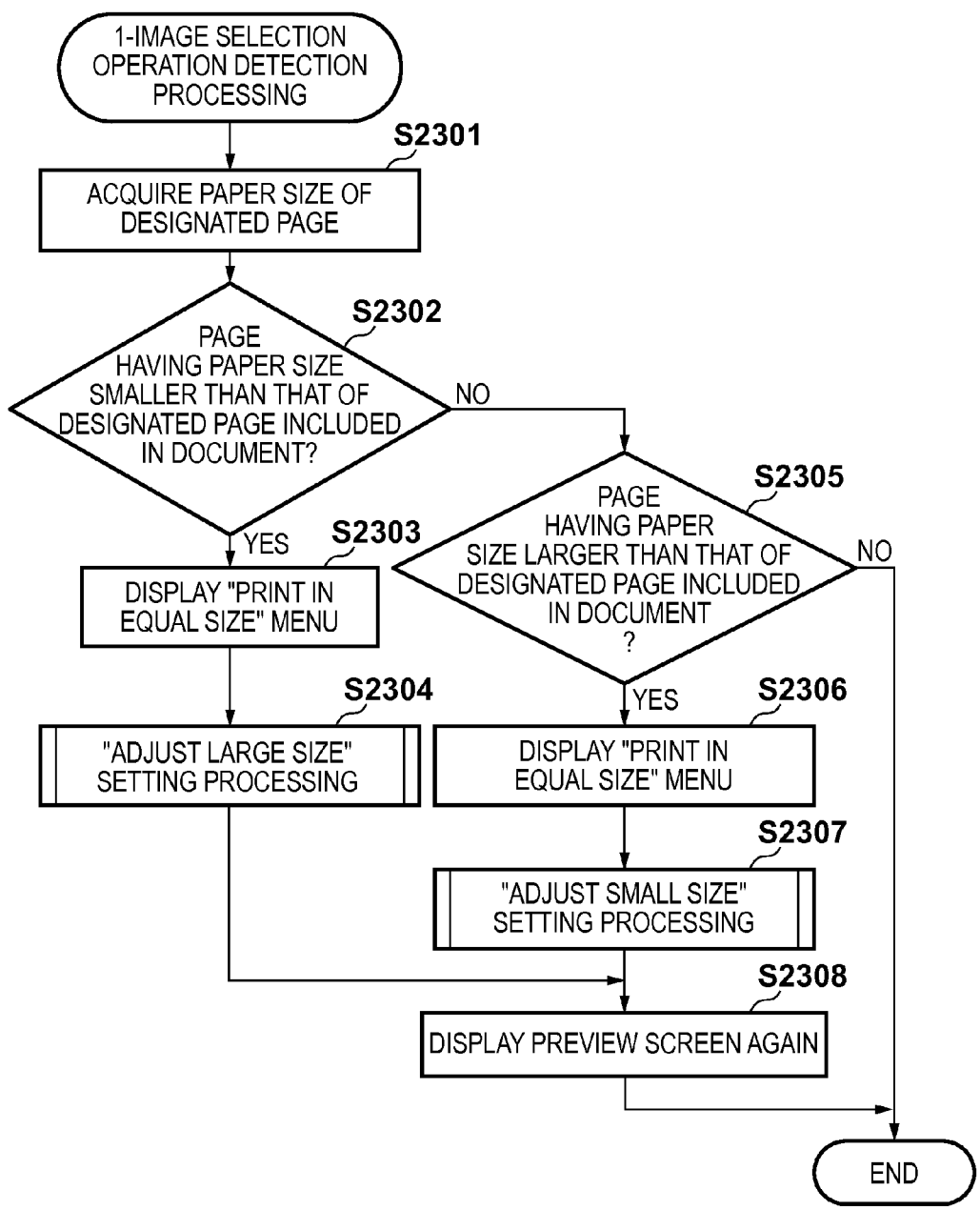
FIG. 23 is a flowchart for explaining 1-image selection operation detection processing of an image forming apparatus according to the third embodiment.

FIG. 23 is a flowchart for explaining 1-image selection operation detection processing of the image forming apparatus according to the third embodiment. Note that the program used to execute this processing is stored in a ROM 220 and executed under the control of a CPU 212 of the main controller 211.

Upon detecting the 1-image selection operation, the process advances to step S2301 to acquire the paper size of the selected designated page from the image attribute/print setting file. The process then advances to step S2302 to acquire the paper sizes from the image attribute/print setting files of the respective pages in the document and compare them with the paper size of the designated page. It is thus determined whether the document includes a page having a paper size smaller than that of the designated page. If a page having a smaller paper size exists in step S2302, the process advances to step S2303. This is the case in which the user has touched a page 523 having a large paper size in the document, as shown in FIG. 21A. After the "print in equal size" menu 2102 is displayed in step S2303, the process advances to step S2304. In step S2304, the menu shown in FIG. 21B is displayed, and setting is done. Details of the processing will be described later.

On the other hand, if NO in step S2302, the process advances to step S2305. In step S2305, the paper sizes of the respective pages in the document are compared with the paper size of the designated page, as in step S2302. It is thus determined whether the document includes a page having a paper size larger than that of the designated page. If YES in step S2305, this is the case in which the user has touched a page having a small paper size in the document, as shown in FIG. 22A. At this time, the process advances to step S2306 to display the "print in equal size" menu 2202 and then advances to step S2307. In step S2307, the menu shown in FIG. 22B is displayed, and setting is done. Details of the processing will be described later. When one of the setting processes in steps S2304 and S2307 has ended, the process advances to step S2308 to display the preview screen again, and the setting processing upon detecting the 1-image selection operation ends. If NO in both of steps S2302 and S2305, that is, if all pages in the document have the same paper size, the setting processing ends without displaying the "print in equal size" menu.

Figure 24:
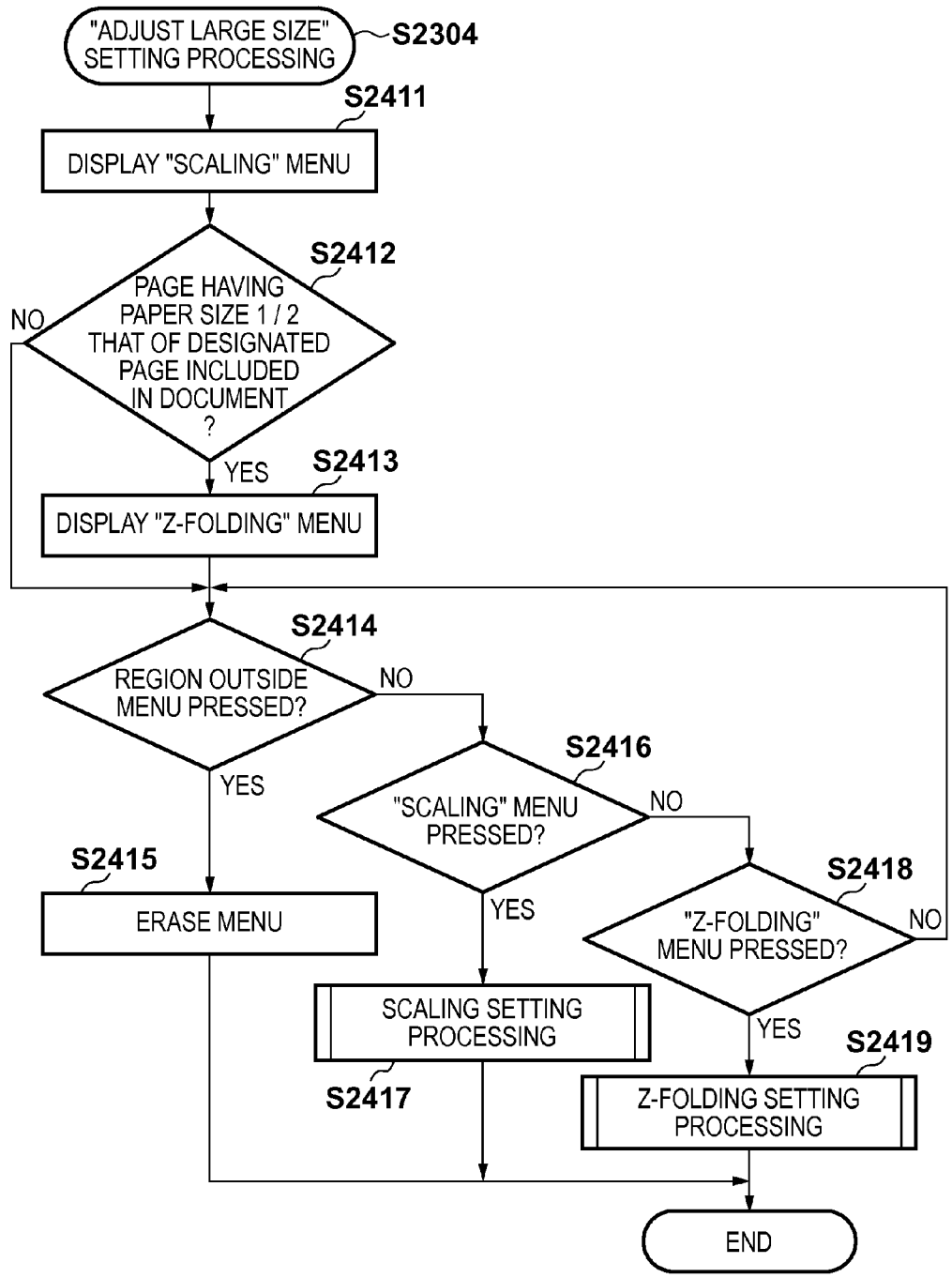
FIG. 24 is a flowchart for explaining processing in step S2304 of FIG. 23.

FIG. 24 is a flowchart for explaining processing of adjusting a large size to a small size in step S2304 of FIG. 23.

When setting processing of adjusting the large size starts, the scaling menu 2103 is displayed in step S2411. The process then advances to step S2412 to compare the paper sizes of the respective pages in the document with the paper size of the designated page, as in step S2302. It is thus determined whether the document includes a page having a size ½ the paper size of the designated page. For example, it is determined whether a page of A4 size exists when the size of the designated page is A3, or whether a page of B5 size exists when the size of the designated page is B4. That is, it is determined whether the output sizes are equal when the designated page is z-folded. If YES in step S2412, the process advances to step S2413 to display the z-folding menu 2104. If NO in step S2412, that is, if no page whose size is equal to that of the z-folded designated page exists in the document, the process advances to step S2414 while skipping step S2413 not to display the z-folding menu 2104.

In step S2414, it is determined whether the user has pressed a region outside the menu on a UI display unit 151. If NO in step S2414, the process advances to step S2416 to determine whether the user has pressed the scaling menu 2103. If NO In step S2416 as well, the process advances to step S2418 to determine whether the user has pressed the "z-folding" menu 2104. If NO in step S2418 as well, the process returns to step S2414 to repeat the above-described determination and wait for user input. Note that if NO in step S2412, the z-folding menu 2104 is not displayed, and therefore, the determination in step S2418 always ends with a NO. If YES in step S2414, interpreting the operation as a menu selection cancel operation by the user, the process advances to step S2415 to erase the "print in equal size" menu 2102, the scaling menu 2103, and the z-folding menu 2104, and the processing is completed.

If the user has pressed the scaling menu 2103 in step S2416, the process advances to step S2417 to execute scaling setting processing. The processing contents in step S2417 are the same as those performed when the user has pressed the "scaling" menu 1305 selected by pressing the "adjust to larger size" menu 1203, which have been described with reference to the flowcharts of FIGS. 18A and 18B, except the following point. That is, the processing is different in that the page of image data read out in step S1811 or the page of the paper size acquired in step S1821 is the page selected by the user.

If the user has pressed the z-folding menu 2104 in step S2418, the process advances to step S2419 to perform z-folding setting processing. The processing in step S2419 is the same as that performed when the user has pressed the z-folding menu 1307 in FIG. 13B, which has been described with reference to the flowchart of FIG. 20, except the following point. That is, the processing is different in that the designated page in steps S2005 and S2006 is the page selected by the user. When the setting processing in step S2417 or S2419 has ended, the setting processing of making the sizes equal when the user has selected the large size is completed.

Figure 25:
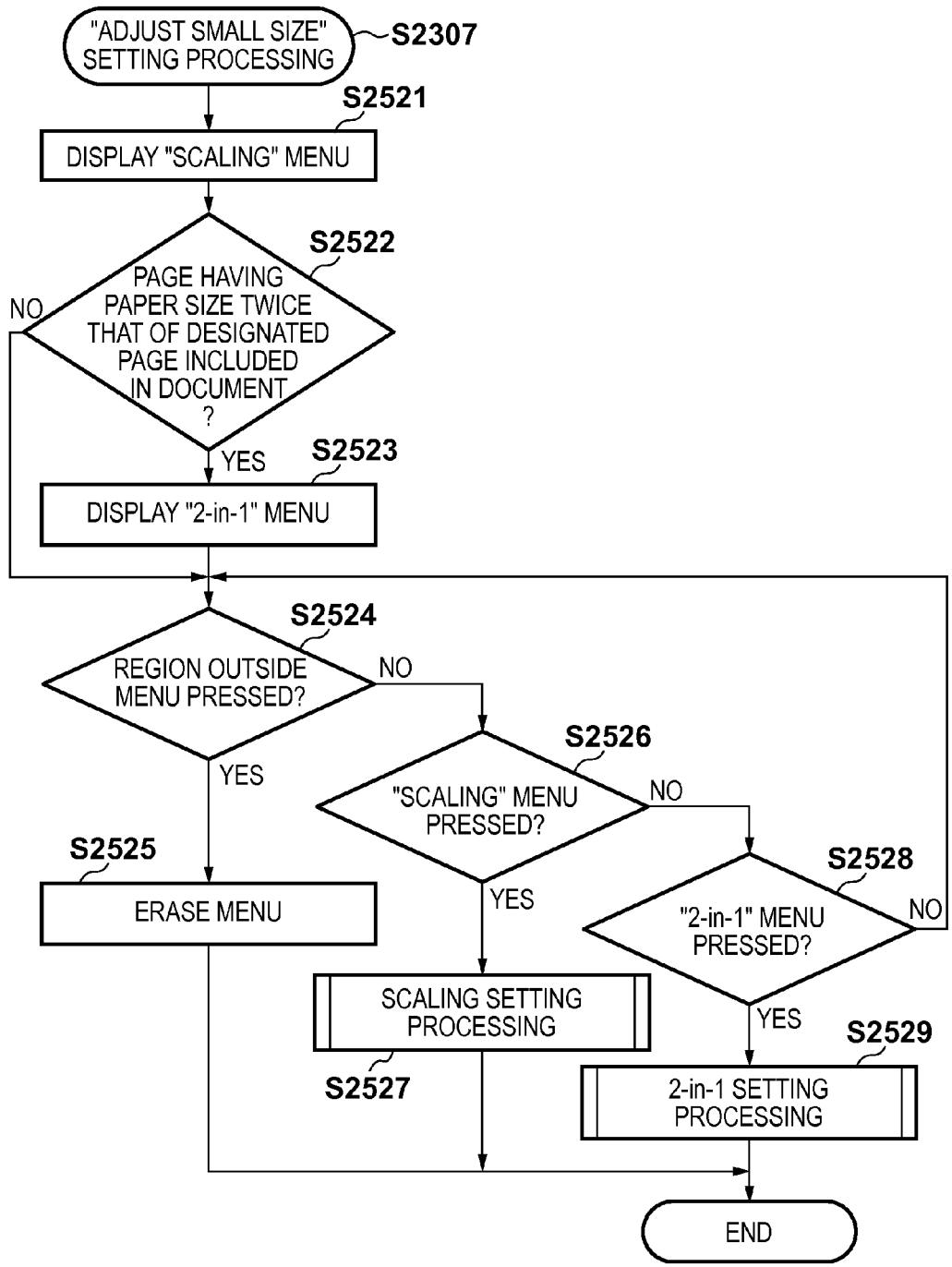
FIG. 25 is a flowchart for explaining processing in step S2307 of FIG. 23.

FIG. 25 is a flowchart for explaining processing of adjusting a small size to a large size in step S2307 of FIG. 23.

This processing is different only in the steps concerning 2-in-1 setting processing. That is, steps S2522, S2523, S2528, and S2529 are different. Only details of the processes of these steps will be described.

In step S2522, the paper size of the designated page is compared with the paper sizes of the respective pages in the document, as in step S2412. In this case, it is determined whether the document includes a page having a size twice the paper size of the designated page. For example, it is determined whether a page of A3 size exists when the size of the designated page is A4, or whether a page of B4 size exists when the size of the designated page is B5. At this time, when 2-in-1 printing of arraying two designated pages and outputting them to the same paper sheet is performed, the designated page and the pages in the document can be printed in equal size. If YES in step S2522, the process advances to step S2523 to display the 2-in-1 menu 2204. If NO in step S2522, the process skips step S2523 not to display the 2-in-1 menu 2204 because the pages cannot be printed in equal size even by 2-in-1 printing.

In step S2528, it is determined whether the user has pressed the 2-in-1 menu 2204. If YES in step S2528, the process advances to step S2529 to perform 2-in-1 setting processing. The processing in step S2529 is the same as that performed when the user has pressed the 2-in-1 menu 813 in FIG. 8B, which has been described with reference to FIGS. 11A and 11B, except the following point. That is, although the user selects two pages in step S1101 of FIG. 11A or in step S1111 of FIG. 11B, only one page is selected in the processing shown in FIG. 25. For this reason, the processing in step S2529 is different in using two pages, that is, the selected page and an adjacent page. In addition, the 2-in-1 setting processing is performed for all pages in FIG. 11B. In the processing shown in FIG. 25, however, the paper size of the page selected first is compared with the paper sizes of the respective pages in the document, and the 2-in-1 setting processing is not performed if the paper sizes are different.

Processing of printing one image selected by the user in size equal to that of the other pages in the document has been described above. Changing the menu to be presented to the user based on the difference between the paper size of each page in a document and the paper size of a selected page yields the following effects. That is, it is possible to present a menu for appropriately equalizing the size depending on whether the sizes are different, or a page having a twice or ½ paper size exists. This allows the user to intuitively do the print settings. If there is no difference in the paper size, the menu for printing images in equal size is not displayed to reduce the possibility that the user erroneously does the settings.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246858, filed Nov. 10, 2011, which is hereby incorporated by reference herein in its entirety.

The invention claimed is:

1. A print setting apparatus that includes an operation unit having a touch panel function, the print setting apparatus comprising:
   a display unit configured to cause the operation unit to display images including a first image and a second image respectively corresponding to a first page and a second page of a plurality of pages; and
   a control unit configured to (1) accept, in response to at least one of the first image and the second image being touched and dragged on the operation unit such that the first image and the second image are moved close to each other on the operation unit, a first selection between (a) whether to make a setting to print the first image and the second image on a same surface of one sheet and (b) whether to make a setting to print the first image and the second image on respective surfaces of one sheet, and (2) control to make the setting to print the first image and the second image in accordance with the first selection.

2. The print setting apparatus according to claim 1, wherein the control unit is further configured to accept a second selection as to whether or not to apply the setting made in accordance with the first selection to all of the plurality of pages, and
   wherein the control unit is further configured to apply, in accordance with the second selection, the setting made in accordance with the first selection to all of the plurality of pages.

3. The print setting apparatus according to claim 1, further comprising a reading unit configured to read an image on an original,
   wherein the images displayed on the operation unit are images read by the reading unit.

4. The print setting apparatus according to claim 1, further comprising a printing unit configured to print an image onto an original,
   wherein the displaying of the images on the operation unit is for a preview.

5. The print setting apparatus according to claim 1, wherein the control unit is further configured to change, in accordance with one of the first image and the second image being dragged while another one of the first image and the second image is not being touched on the operation unit, an order of a page corresponding to the dragged image.

6. The print setting apparatus according to claim 1, wherein the control unit is further configured to, in accordance with a pinch-out operation being performed while a plurality of portions in either the first image or the second image are being touched on the operation unit, enlarge display of the touched image.

7. A control method for controlling a print setting apparatus that includes an operation unit having a touch panel function, the control method comprising:
   causing the operation unit to display images including a first image and a second image respectively corresponding to a first page and a second page of a plurality of pages; and
   controlling, to (1) accept, in response to at least one of the first image and the second image being touched and dragged on the operation unit such that the first image and the second image are moved close to each other on the operation unit, a selection between (a) whether to make a setting to print the first image and the second image on a same surface of one sheet and (b) whether to make a setting to print the first image and the second image on respective surfaces of one sheet, and (2) to make the setting to print the first image and the second image in accordance with the selection.

8. A non-transitory computer-readable storage medium storing a program that causes a computer to perform a method for controlling a print setting apparatus that includes an operation unit having a touch panel function, the method comprising:
   causing the operation unit to display images including a first image and a second image respectively corresponding to a first page and a second page of a plurality of pages; and
   controlling, to (1) accept, in response at least one of the first image and the second image being touched and dragged on the operation unit such that the first image and the second image are moved close to each other on the operation unit, a selection between (a) whether to make a setting to print the first image and the second image on a same surface of one sheet and (b) whether to make a setting to print the first image and the second image on respective surfaces of one sheet, and (2) to make the setting to print the first image and the second image in accordance with the selection.

9. An apparatus comprising:
   a display unit configured to cause an operation unit having a touch panel function to display images including a first image and a second image respectively corresponding to a first page and a second page of a plurality of pages; and
   a control unit configured to (1) accept, in response to the first image and the second image being subjected to a pinching gesture on the operation unit, a first selection between (a) whether to make a setting to print the first image and the second image on a same surface of one sheet and (b) whether to make a setting to print the first image and the second image on respective surfaces of one sheet, and (2) control to make the setting to print the first image and the second image in accordance with the first selection.

10. The print setting apparatus according to claim 1, wherein the first selection is made by a user from a menu on the operation unit that lists (a) and (b) as options and that is displayed in response to at least one of the first image and the second image being touched and dragged on the operation unit such that the first image and the second image are moved close to each other on the operation unit.

* * * * *